(12) United States Patent
Osterman et al.

(10) Patent No.: US 10,293,837 B2
(45) Date of Patent: *May 21, 2019

(54) MULTI-PASSENGER RIDE VEHICLE

(71) Applicant: Universal City Studios LLC, Universal City, CA (US)

(72) Inventors: Ross Alan Osterman, Winter Park, FL (US); Justin Michael Schwartz, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/895,514

(22) Filed: Feb. 13, 2018

(65) Prior Publication Data

US 2018/0170399 A1    Jun. 21, 2018

Related U.S. Application Data

(63) Continuation of application No. 14/970,132, filed on Dec. 15, 2015, now Pat. No. 9,889,860.

(51) Int. Cl.
*B60W 50/10* (2012.01)
*A63G 33/00* (2006.01)
(Continued)

(52) U.S. Cl.
CPC ............. *B60W 50/10* (2013.01); *A63G 25/00* (2013.01); *A63G 31/00* (2013.01); *A63G 31/16* (2013.01);
(Continued)

(58) Field of Classification Search
CPC ...... B60W 50/10; B60W 10/18; B60W 30/18; B60W 50/14; B60W 10/04; B60W 10/20;
(Continued)

(56) References Cited

U.S. PATENT DOCUMENTS 6,241,573 B1   6/2001 Ostendorff et al.
6,796,908 B2 * 9/2004 Weston .................... A63G 7/00
                                                      434/55
(Continued)

FOREIGN PATENT DOCUMENTS

CN      203186453 U    9/2013
JP      1989-043986    2/1989
(Continued)

OTHER PUBLICATIONS

PCT/US2016/066350 Invitation to Pay Additional Fees dated Sep. 6, 2017 (15 pages).
(Continued)

*Primary Examiner* — Jaime Figueroa
(74) *Attorney, Agent, or Firm* — Fletcher Yoder, P.C.

(57) ABSTRACT

A control system to control a multi-passenger ride vehicle includes a controller. The controller receives a first user feedback from a first user input device and a second user feedback from a second user input device. The controller selects the first user feedback, the second user feedback, or a combination thereof for a determination of a vehicle path of the multi-passenger ride vehicle. The controller determines the vehicle path using the first user feedback, the second user feedback, or the combination thereof based on the selection. The controller controls movement of the multi-passenger ride vehicle based on the vehicle path.

20 Claims, 8 Drawing Sheets

(51) Int. Cl.
*A63G 31/00* (2006.01)
*B60W 50/14* (2012.01)
*B60W 10/20* (2006.01)
*A63G 25/00* (2006.01)
*B60W 10/04* (2006.01)
*B60W 10/18* (2012.01)
*B60W 30/18* (2012.01)
*A63G 31/16* (2006.01)

(52) U.S. Cl.
CPC ............. *A63G 33/00* (2013.01); *B60W 10/04* (2013.01); *B60W 10/18* (2013.01); *B60W 10/20* (2013.01); *B60W 30/18* (2013.01); *B60W 50/14* (2013.01); *B60W 2050/146* (2013.01); *B60W 2300/30* (2013.01); *B60W 2540/10* (2013.01); *B60W 2540/12* (2013.01); *B60W 2540/18* (2013.01); *B60W 2720/24* (2013.01)

(58) Field of Classification Search
CPC ......... B60W 2540/18; B60W 2540/10; B60W 2720/24; B60W 2050/146; B60W 2540/12; B60W 2300/30; A63G 31/16; A63G 33/00; A63G 31/00; A63G 25/00
USPC ....................................................... 701/1, 42
See application file for complete search history.

(56) References Cited

U.S. PATENT DOCUMENTS

| | | | | |
|---|---|---|---|---|
| 9,084,941 B1* | 7/2015 | Fram | ....................... | A63G 31/16 |
| 9,463,379 B1* | 10/2016 | Brister | ................... | A63G 31/00 |
| 2009/0125161 A1 | 5/2009 | Baur et al. | | |
| 2011/0010618 A1 | 1/2011 | Crawford et al. | | |
| 2011/0312428 A1* | 12/2011 | Nemeth | ................... | A63G 1/24 |
| | | | | 472/30 |
| 2012/0149479 A1 | 6/2012 | Nemeth et al. | | |
| 2012/0149480 A1 | 6/2012 | Crawford et al. | | |
| 2013/0045804 A1* | 2/2013 | Ruke | ...................... | A63G 31/00 |
| | | | | 463/42 |
| 2013/0144468 A1* | 6/2013 | Foster | ...................... | B62D 3/00 |
| | | | | 701/2 |
| 2013/0145953 A1* | 6/2013 | Crawford | ............... | A63G 31/16 |
| | | | | 104/28 |
| 2014/0309035 A1* | 10/2014 | Crawford | .............. | A63F 13/803 |
| | | | | 463/36 |
| 2015/0012157 A1 | 1/2015 | Nemeth et al. | | |
| 2015/0360127 A1 | 12/2015 | Boyle | | |

FOREIGN PATENT DOCUMENTS

| | | |
|---|---|---|
| JP | 1990-147080 | 6/1990 |
| JP | 1991-193080 | 8/1991 |
| KR | 1019980025230 | 7/1998 |
| KR | 20000008295 | 2/2000 |
| KR | 101545078 | 8/2015 |
| RU | 158134 | 12/2015 |
| WO | 9831444 A1 | 7/1998 |

OTHER PUBLICATIONS

2018125938 Official Decision of Grant dated Nov. 14, 2018.
KR 2018-7019954 Preliminary Rejection dated Sep. 18, 2018.
KR 2018-7019954 Notice of Allowance dated Dec. 13, 2018.
JP 2018-531555 Office Action dated Nov. 5, 2018.

* cited by examiner

MULTI-PASSENGER RIDE VEHICLE

CROSS-REFERENCE TO RELATED APPLICATIONS

This application is a continuation of U.S. patent application Ser. No. 14/970,132 entitled "MULTI-PASSENGER RIDE VEHICLE," filed Dec. 15, 2015, which is hereby incorporated by reference in its entirety for all intents and purposes.

FIELD OF DISCLOSURE

The present disclosure relates generally to the field of amusement parks. More specifically, embodiments of the present disclosure relate to multi-passenger ride vehicles used in conjunction with amusement park games or rides.

BACKGROUND

Various amusement rides have been created to provide passengers with unique motion and visual experiences. For example, theme rides can be implemented with single-passenger or multi-passenger ride vehicles that travel along a fixed or variable path. Ride vehicles themselves may include features providing passengers with varying levels of control (e.g., various buttons and knobs) over the ride vehicle and/or surrounding environment. However, traditional controls given to passengers of a ride vehicle are generally limited when the ride vehicle follows a pre-determined, fixed path. Further, traditional controls of multi-passenger ride vehicles generally only provide a single passenger with steering control over the ride vehicle. Accordingly, it is now recognized that there is a need for an improved amusement ride that provides enhanced passenger control over the ride vehicle to create a more adventurous ride experience.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes a multi-passenger ride vehicle configured to accommodate two or more passengers. The multi-passenger ride vehicle includes a plurality of user input devices each configured to receive input from a passenger of the two or more passengers and to generate feedback in response to input from the respective passenger. The plurality of user input devices includes a first user input device configured to generate first feedback and a second user input device configured to generate second feedback. The first and second feedback include a first feedback type associated with a first operation of the multi-passenger ride vehicle. Additionally, the plurality of user input devices includes a third user input device configured to generate third feedback and a fourth user input device configured to generate fourth feedback. The third and fourth feedback include a second feedback type associated with a second operation of the multi-passenger ride vehicle different from the first operation. Further, the system includes a controller configured to receive the first, second, third, and fourth feedback, to control the first operation of the multi-passenger ride vehicle based on a first selection of the first feedback, the second feedback, or both, and to control the second operation of the multi-passenger ride vehicle based on a second selection of the third feedback, the fourth feedback, or both.

In another embodiment, a multi-passenger ride vehicle includes a first user input device configured to generate first feedback based on input from a first passenger of the multi-passenger ride vehicle. The multi-passenger ride vehicle also includes a second user input device configured to generate second feedback based on input from a second passenger of the multi-passenger ride vehicle. Further, the multi-passenger ride vehicle includes a controller configured to receive the first and second feedback and to select the first feedback, the second feedback, or both for a determination of a vehicle path. Additionally, the controller is configured to determine the vehicle path using the first feedback, the second feedback, or both based on the selection and to control movement of the multi-passenger ride vehicle based on the vehicle path.

In another embodiment, a method includes receiving first steering feedback from a first user input device of a multi-passenger ride vehicle in response to input from a first passenger of the multi-passenger ride vehicle. The method also includes receiving first speed feedback from a second user input device of the multi-passenger ride vehicle in response to input from a second passenger of the multi-passenger ride vehicle. Additionally, the method includes determining a vehicle path. Determining the vehicle path includes determining a direction of the vehicle path based on the first steering feedback and determining a speed of the vehicle path based on the second steering feedback. Further, the method includes controlling movement of multi-passenger ride vehicle based on the vehicle path.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
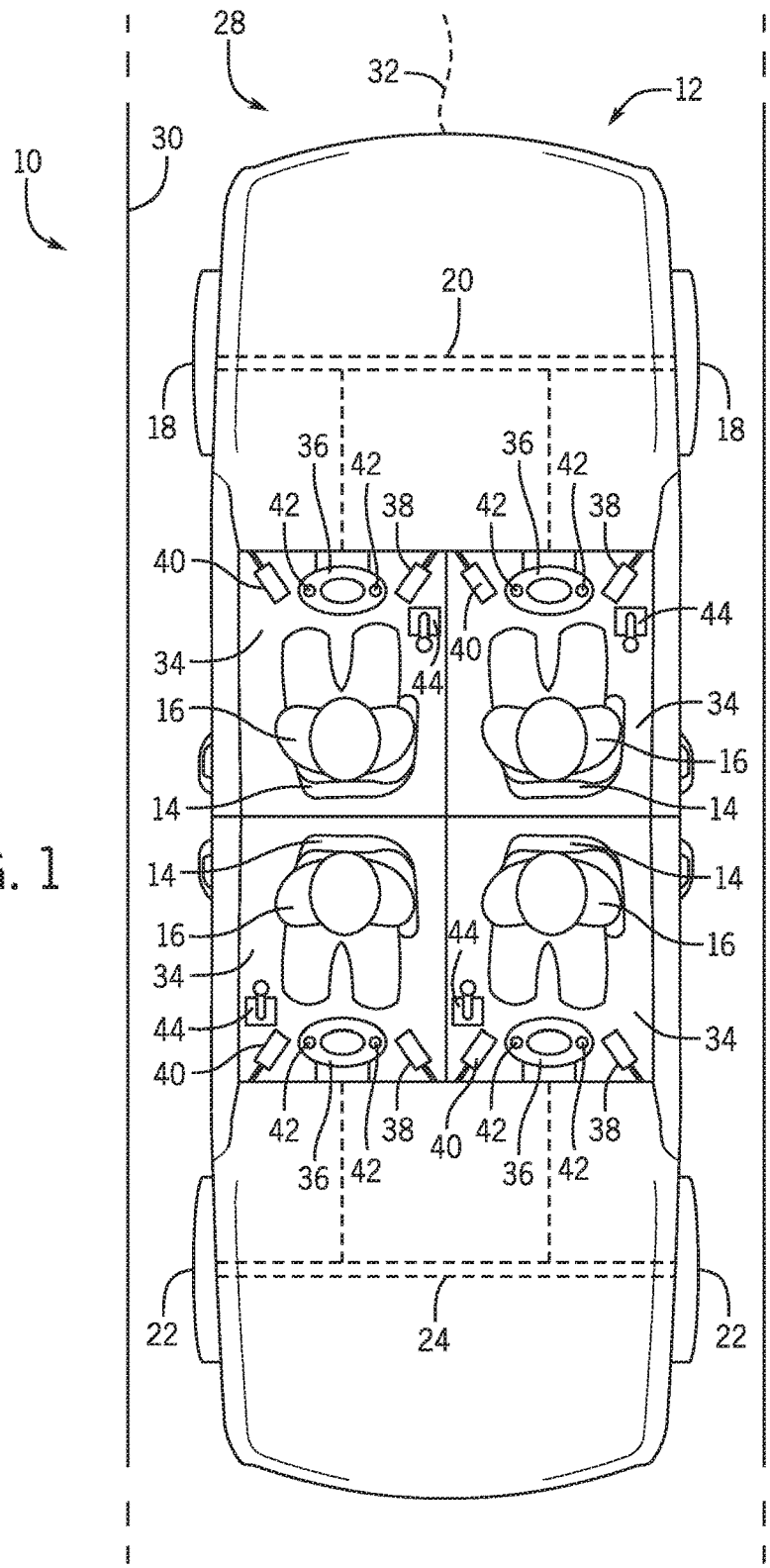
FIG. 1 is an overhead view of an interactive ride system including a multi-passenger ride vehicle in accordance with present techniques.

The present disclosure is directed to an interactive ride that includes a multi-passenger ride vehicle having various user input devices that enable cooperative, competitive, or sequential/alternating passenger control of the multi-passenger ride vehicle to provide a dynamic ride experience for each passenger. The interactive ride is in contrast to passive rides that provide a static experience for each passenger. For example, a passive ride does not include variable routes or outcomes based on inputs each time the ride is taken and/or does not permit dynamic passenger control of features of the ride vehicle. The present techniques facilitate a potentially different experience for each multi-passenger ride vehicle and/or each passenger each time the ride is taken. In particular, each passenger of the multi-passenger ride vehicle may actively control at least one feature or operation of the multi-passenger ride vehicle for at least a portion of the interactive ride. For example, one or more passengers of the multi-passenger ride vehicle may actively control various user input devices of the multi-passenger ride vehicle, such as steering wheels, joysticks, gas pedals, brake pedals, buttons, levers, switches, touch-screen displays, and the like. The user input devices may generate feedback relating to movement of the multi-passenger ride vehicle (e.g., speed, acceleration, deceleration, direction, and/or orientation), feedback relating to rewards in the interactive ride, feedback relating to obstacles in the interactive ride, feedback relating to other multi-passenger ride vehicles or other objects in the interactive ride, or a combination thereof based on input from the one or more passengers. The feedback generated by the user input devices may be used to control features or operations of the multi-passenger ride vehicle such as movement of the multi-passenger ride vehicle, obtaining rewards, avoiding obstacles, and/or engaging with other multi-passenger ride vehicles and/or objects in the interactive ride.

In certain embodiments, two or more passengers of the multi-person ride vehicle may actively control the same operation at the same time for cooperative control of the operation. That is, two passengers may each control a user input device that generates the same type of feedback (e.g., feedback relating to the same operation), and feedback from the two user input devices may be used to cooperatively control the operation. For example, two passengers may each control a steering wheel, and a cooperative aggregate from the control of the two steering wheels may determine the steering or vehicle path of the multi-passenger vehicle. In some embodiments, each passenger of the multi-passenger ride vehicle may actively control a different operation of the multi-passenger ride vehicle. For example, a first passenger may control a user input device that generates feedback relating to steering, a second passenger may control a user input device that generates feedback relating to acceleration, a third passenger may control a user input device that generates feedback relating to rewards, and a fourth passenger may control a user input device that generates feedback relating to obstacles. Further, in some embodiments, control of various operations of the multi-passenger ride vehicle may rotate between passengers throughout the duration of the interactive ride. For example, control of various operations of the multi-passenger ride vehicle may cycle between the passengers and/or may be given to passengers based on previous passenger performance for the respective operation. In this manner, the interactive ride enables each passenger of the multi-passenger ride vehicle control of at least one operation of the multi-passenger ride vehicle to provide each passenger with a unique, dynamic ride experience and to provide continued interest over several park visits.

The disclosed interactive ride may be implemented with amusement park attractions including rides, shows, promotions, and so forth. By employing the interactive ride in conjunction with particular themes, such as various racing themes, guests are incentivized to visit the amusement park and are further enabled to enjoy the thematic experience provided by the amusement park. Further, because the interactive ride is configurable and dynamic, one ride environment may be configured to host rides, races and/or games having a number of different themes or narratives.

With the foregoing in mind, FIG. 1 illustrates an embodiment of an interactive ride system 10 in accordance with the present disclosure. The interactive ride system 10 may include one or more multi-passenger ride vehicles 12. In particular, each multi-passenger ride vehicle 12 includes at least two passenger seats 14 (e.g., 2, 3, 4, 5, 6, 7, 8, 9, 10, or more) to enable each multi-passenger ride vehicle 12 to accommodate at least two passengers 16. The passenger seats 14 may be disposed in any suitable location of the multi-passenger ride vehicle 12, such as in the front and/or back of the multi-passenger ride vehicle 12. Further, each passenger seat 14 may be oriented in any direction in the multi-passenger ride vehicle 12. Additionally, in some embodiments, one or more of the passenger seats 14 may be elevated with respect to the remaining passenger seats 14. Each multi-passenger ride vehicle 12 may also include front wheels 18 connected to a front axle 20 and rear wheels 22 connected to a rear axle 24.

The interactive ride system 10 includes a ride environment 28 for the one or more multi-passenger ride vehicles 12. In particular, the one or more multi-passenger ride vehicles 12 are positioned within and configured to move in the ride environment 28. In certain embodiments, the one or more multi-passenger ride vehicles 12 travel along a ride course 30 within the ride environment 28. The ride course 30 may be any surface on which the multi-passenger ride vehicle 12 travels. For example, the ride course 30 may include one or more tracks, one or more roads, one or more open surfaces, or a combination thereof. In one embodiment, the interactive ride system 10 is a "drive-by-wire" system in which a controller (e.g., one or more controllers) controls the movement (e.g., direction, speed, acceleration, and/or orientation) of the multi-passenger ride vehicles 12. As such, the ride course 30 may not dictate the path traveled by the multi-passenger ride vehicles 12. Instead, one or more controllers may determine a plurality of different or variable ride paths 32 of the multi-passenger ride vehicles 12 within the ride course 30. In some embodiments, one or more controllers may enable free motion of the multi-passenger ride vehicles 12 (e.g., the multi-passenger ride vehicles 12 may drive anywhere or anywhere within a predetermined boundary). In certain embodiments, one or more controllers may enable movement through branching fixed paths. For example, one or more controllers may select the variable ride path 32 from a plurality of branching fixed paths. Further, in some embodiments, one or more controllers may control the multi-passenger ride vehicle 12 to cause the multi-passenger ride vehicle 12 to travel with variable speed, variable direction (e.g., forward, backward, sideways, diagonally, etc.), and/or variable orientation. For example, the one or more controllers may cause the multi-passenger ride vehicle 12 to spin, pitch, roll, and/or yaw to change the orientation of the multi-passenger ride vehicle 12. As such, the interactive ride system 10 facilitates a potentially different ride path 32 for each multi-passenger ride vehicle 12 each time the ride is taken.

Further, as will be described in more detail below, the passengers 16 in each multi-passenger ride vehicle 12 may control one or more operations (e.g., actions, functions, etc.) of the respective multi-passenger ride vehicle 12, such as movement of the respective multi-passenger ride vehicle 12, obtaining rewards, avoiding obstacles, and/or engaging with other multi-passenger ride vehicles 12 in the interactive ride system 10. For example, the passengers 16 in each multi-passenger ride vehicle 12 may cooperatively or individually control the movement (e.g., direction, speed, and/or orientation) of the respective multi-passenger ride vehicle 12 to control the ride path 32 taken by the respective multi-passenger ride vehicle 12. For example, in some embodiments, the passengers 16 in a multi-passenger ride vehicle 12 may cooperatively or individually control free motion of the respective multi-passenger ride vehicle 12. In certain embodiments, the passengers 16 in a multi-passenger ride vehicle 12 may cooperatively or individually control the selection of a fixed ride path 32 from a plurality of branching fixed paths. To enable the passengers 16 to control operation of each multi-passenger ride vehicle 12, each multi-passenger ride vehicle 12 may include at least one user input device 34 for each passenger 16. Each user input device 34 generates feedback or signals in response to input from a passenger 16. For example, each user input device 34 may generate feedback or signals in response to actuation or movement of the respective user input device 34 by a passenger 16. In some embodiments, the user input devices 34 may generate feedback relating to movement of the multi-passenger ride vehicle 12, feedback relating to rewards, feedback relating to obstacles, or a combination thereof. As illustrated, each user input device 34 may be disposed proximate to a passenger seat 14 such that the passenger 16 in the respective passenger seat 14 may easily interact with and/or actuate the respective user input device 34. For example, each user input device 34 for each passenger seat 14 may be positioned about the respective passenger seat 14 such that each user input device 34 is within arm's reach of the passenger 16 in the respective passenger seat 14. In some embodiments, each user input device 34 may be disposed proximate to a passenger seat 14 such that the user input devices 34 are disposed proximate to (e.g., within arm's reach of) a passenger 16 in the respective passenger seat 14 and a distance away from (e.g., out of arm's reach of) passengers 16 in the other passenger seats 14 of the multi-passenger ride vehicle 12.

In the illustrated embodiment, the at least one user input device 34 includes a steering wheel 36, a gas pedal 38, a brake pedal 40, one or more buttons 42, and a joystick 44 (e.g., to move sideways and/or diagonally or to control movement in all directions), a touch-screen display (not shown). However, it should be appreciated that in some embodiments, the at least one user input device 34 may include any number of user input devices and any suitable types of user input devices, such as a throttle, a hand brake, etc. Further, it should be appreciated that the at least one user input device 34 for a passenger 16 generates the same type of feedback or a different type of feedback as another user input device 34 for another passenger 16. By way of example, in one embodiment, the multi-passenger ride vehicle 12 may include the steering wheel 36 proximate to a first passenger seat, the gas pedal 38 proximate to a second passenger seat, the brake pedal 40 proximate to a third passenger seat, and the buttons 42 proximate to a fourth passenger seat.

Figure 2:
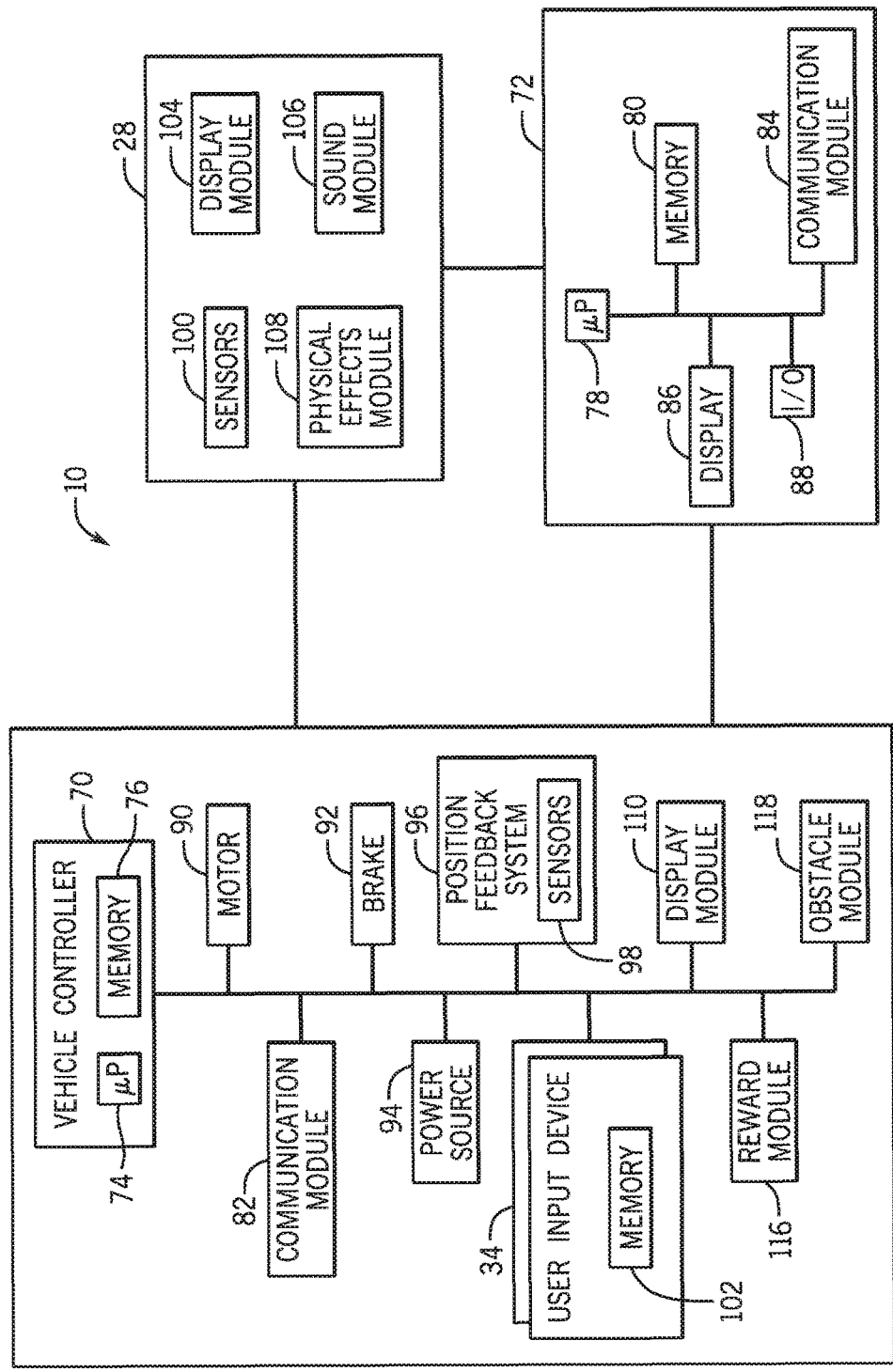
FIG. 2 is a block diagram of an interactive ride system including a multi-passenger ride vehicle in accordance with present techniques.

As illustrated in FIG. 2, each multi-passenger ride vehicle 12 may include a vehicle controller 70 (e.g., a single controller or multiple controllers in cooperation) that receives signals (e.g., inputs, feedback, etc.) from the user input devices 34 and processes the received signals to control operation of the respective multi-passenger ride vehicle 12. For example, the vehicle controller 70 may process signals from the user input devices 34 to control operations of the multi-passenger ride vehicle 12 such as movement of the multi-passenger ride vehicle 12, obtaining rewards, avoiding obstacles, and/or engaging with other multi-passenger ride vehicles 12 and/or characters in the interactive ride system 10. In particular, the vehicle controller 70 may determine the path 32 of each multi-passenger ride vehicle 12 based at least in part on one or more signals from the user input devices 34. As noted above, the path 32 may be free motion of the multi-passenger ride vehicle 12 or a selected fixed path from a plurality of branching fixed paths. It should be appreciated that in embodiments in which the path 32 is a selected fixed path, the vehicle controller 30 may change the path 32 (e.g., select a different fixed path 32) based on one or more signals from the user input devices 34. For example, the vehicle controller 30 may select a first fixed path 32 (e.g., at a first branch in the ride course 30) based on one or more signals from one or more user input devices 34, and the vehicle controller 30 may select a second fixed path 32 (e.g., at a second branch in the ride course 30) based on one or more signals form one or more user input devices 34. As will be described in more detail below, the vehicle controller 70 may control operation of the multi-passenger ride vehicle 12 based on inputs from the user input devices 34, instructions stored in the vehicle controller 70, and/or instructions from a system controller 72 (e.g., a single controller or multiple controllers in cooperation) of the interactive ride system 10 that is communicatively coupled to the multi-passenger ride vehicle 12.

The vehicle controller 70 may be any device employing a processor 74 (which may represent one or more processors), such as an application-specific processor. The vehicle controller 70 may also include a memory device 76 for storing instructions executable by the processor 74 to perform the methods and control actions described herein for the multi-passenger ride vehicle 12. The processor 74 may include one or more processing devices, and the memory 76 may include one or more tangible, non-transitory, machine-readable media. Further, the system controller 72 may be any device employing a processor 78 (which may represent one or more processors), such as an application-specific processor. The system controller 72 may also include a memory device 80 for storing instructions executable by the processor 78 to perform the methods and control actions described herein for the multi-passenger ride vehicle 12 and the interactive ride system 10. The processor 78 may include one or more processing devices, and the memory 80 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 74, the processor 78, or by any general purpose or special purpose computer or other machine with a processor.

In addition, the system controller 72 may be configured to communicate over wired or wireless communication paths with the multi-passenger ride vehicles 12 and any other components of the interactive ride system 12. For example, the multi-passenger ride vehicle 12 may include a vehicle communication module 82, and the system controller 72 may include a system communication module 84 to facilitate transmission of information between the multi-passenger ride vehicle 12 and the system controller 72. In certain embodiments, the vehicle communication module 82 may also facilitate transmission of information with other multi-passenger ride vehicles 12. Additionally, the system controller 72 may include a distributed control system (DCS) or any computer-based workstation including a display 86 and an input/output interface 88 that is fully or partially automated.

To provide movements of the multi-passenger ride vehicle 12, the multi-passenger ride vehicle 12 includes a motor 90 and a brake 92. The movements of the multi-passenger ride vehicle 12 may include running (e.g., acceleration, deceleration), turning, and stopping of the multi-passenger ride vehicle 12. The motor 90 may be powered by any suitable power source 94, including, but not limited to, a battery, a solar panel, an electrical generator, a gas engine, or any combination thereof. The operations of the motor 90 and the brake 92 may be controlled by the vehicle controller 70. For example, the vehicle controller 70 may control the motor 90 to adjust its output power to accelerate or decelerate the multi-passenger ride vehicle 12 based on feedback received from one or more user input devices 34, such as one or more gas pedals 38 or throttles. The vehicle controller 70 may also control the brake 92 to decelerate or stop the multi-passenger ride vehicle 12 based on feedback received from one or more user input devices 34, such as one or more brake pedals 40 or hand pedals. Further, the vehicle controller 70 may adjust a position of the front axle 20 and/or the back axle 24 of the multi-passenger ride vehicle 12 based on feedback received from one or more user input devices 34, such as one or more steering wheels 36 and/or one or more joysticks 44, to control the steering of the multi-passenger ride vehicle 12. In this manner, the vehicle controller 70 may determine and/or adjust the path 32 of the multi-passenger ride vehicle 12 based on feedback from one or more user input devices 34.

In some embodiments, the vehicle controller 70 may control the motor 90 to cause the multi-passenger ride vehicle 12 to maintain a speed above a minimum speed threshold. That is, the vehicle controller 70 may override inputs from the user input devices 34, such as inputs from the gas pedals 38 and/or inputs from the brake pedals 40, to cause the multi-passenger ride vehicle 12 to travel at a speed above the minimum speed threshold. For example, in some embodiments, it may be desirable for the multi-passenger ride vehicle 12 to complete the ride within a predetermined time, and the minimum speed threshold may be selected to facilitate completion of the ride within the predetermined time. Further, in certain embodiments, multiple multi-passenger ride vehicles 12 may travel through the ride course 30 at the same time. It may be desirable to space out the multi-passenger ride vehicles 12 along the ride course 30, for example to minimize the occurrence of or to prevent collisions between the multi-passenger ride vehicles 12. Accordingly, in certain embodiments, the multi-passenger ride vehicles 12 may begin the ride course 30 at predetermined intervals, and the minimum speed threshold may be selected to facilitate a desired spacing between the multi-passenger ride vehicles 12 throughout the ride course 30. The memory 76 of the vehicle controller 70 and/or the memory 80 of the system controller 72 may store one or more minimum speed thresholds. In some embodiments, the processor 74 of the vehicle controller 70 and/or the processor 78 of the system controller 72 may select a minimum speed threshold from the one or more minimum speed thresholds stored in the memory 76 and/or the memory 80 based on one or more factors of the ride, such as a desired completion time, a desired spacing between multi-passenger ride vehicles 12, etc.

The multi-passenger ride vehicle 12 may include a position feedback system 96 for monitoring its position in the ride course 30. In some embodiments, the position feedback system 96 may include one or more sensors 98 that interact with one or more sensors 100 in the ride environment 28. For example, the sensors 98 and the sensors 100 may include optical components, such as emitters and/or detectors, radio-frequency identification (RFID) components, such as RFID tags and/or RFID transmitters, cameras, or any combination thereof. The sensors 100 may be disposed in or on the ride course 30 and/or disposed in or on one or more physical objects in the ride environment 28. Additionally, the sensors 98 may be disposed in or on or coupled to the multi-passenger ride vehicle 12. In some embodiments, the sensors 98 of the position feedback system 96 may determine position information of the multi-passenger ride vehicle 12 based on feedback from or interaction with the sensors 100 of the ride environment 28. The sensors 98 may determine position information of the multi-passenger ride vehicle 12 based on feedback from or interaction with the sensors 98 of the multi-passenger ride vehicle 12 and may provide the position information to the system controller 72.

The vehicle controller 72 and/or the system controller 72 may use the position information of the multi-passenger ride vehicle 12 in combination with information about the ride environment 28 to control the movement of the multi-passenger ride vehicle 12 to minimize the occurrence of, avoid, or prevent collisions. For example, the information about the ride environment 28 may include information associated with boundaries of the ride course 30, physical objects within the ride environment 28, other multi-passenger ride vehicles 12 in the ride course 30, etc. The information about the ride environment 28 may be determined by the vehicle controller 70 and/or the system controller 72 based on feedback received from the one or more sensors 98, based on feedback from the one or more sensors 100, based on information stored in the memory 76 and/or the memory 80, or a combination thereof. In particular, the vehicle controller 70 and/or the system controller 72 may be configured to override or adjust one or more inputs from the user input devices 34 based at least in part on the position information of the multi-passenger ride vehicle 12 and information about the ride environment 28. For example, the vehicle controller 70 and/or the system controller 72 may override or adjust inputs from the steering wheels 36, the gas pedals 38, the brake pedals 40, joysticks 44, etc. In some embodiments, the vehicle controller 70 and/or the system controller 72 may also use data indicative of the status of the multi-passenger ride vehicle 12 such as velocity, motor output power, inputs from the user input devices 34, etc. In one embodiment, the vehicle communication module 82 may transmit the data indicative of the status of the multi-passenger ride vehicle 12 and a unique identifier associated with the multi-passenger ride vehicle 12 to the system controller 72.

In certain embodiments, the vehicle controller 70 and/or the system controller 72 may determine that a multi-passenger ride vehicle 12 is within a predetermined distance of an object in the ride environment 28 based at least in part on the position information of the multi-passenger ride vehicle 12 and information about the ride environment 28. In such embodiments, the vehicle controller 70 and/or the system controller 72 may override or adjust one or more inputs from the user input devices 34 to adjust the movement of the multi-passenger ride vehicle 12 to maintain or increase the distance between the object and the multi-passenger ride vehicle 12. In some embodiments, the vehicle controller 70 and/or the system controller 72 may determine whether the multi-passenger ride vehicle 12 is likely to collide with an object in the ride environment 28 based on the position information of the multi-passenger ride vehicle 12, information about the ride environment 28, and one or more inputs from the user input devices 34. In such embodiments, the vehicle controller 70 and/or the system controller 72 may override or adjust one or more inputs from the user input devices 34 to adjust the movement of the multi-passenger ride vehicle 12 to maintain or increase the distance between the object and the multi-passenger ride vehicle 12 if the vehicle controller 70 and/or the system controller 72 determines that the multi-passenger ride vehicle 12 will likely collide with the object.

Further, in some embodiments, the vehicle controller 70 and/or the system controller 72 may determine that the multi-passenger ride vehicle 12 is entering a challenging section of the ride course 30, such as a narrow section, a curved section, a section with physical obstacles (e.g., speed bumps, cones, signs, potholes, or any other objects), or a section with other multi-passenger ride vehicles 12. The vehicle controller 70 and/or the system controller 72 may override or adjust one or more inputs from the user input devices 34 to adjust the movement (e.g., decrease the speed) of the multi-passenger ride vehicle 12 when the vehicle controller 70 and/or the system controller 72 may determines that the multi-passenger ride vehicle 12 is entering a challenging section of the ride course 30. In this manner, the vehicle controller 70 and/or the system controller 72 may minimize the occurrence of, avoid, or prevent collisions between the multi-passenger ride vehicle 12 and objects within the ride environment 28.

The vehicle controller 70 may also selectively activate and deactivate one of more of the user input devices 34 to control which user input devices 34 provide feedback or signals to the vehicle controller 70 to control one or more operations of the multi-passenger ride vehicle 12 (e.g., during certain portions of the ride course 30). As used herein, feedback from activated user input devices 34 is used by the vehicle controller 70 to control one or more operations of the multi-passenger ride vehicle 12, and feedback from deactivated user input devices 34 is not used by the vehicle controller 70 to control one or more operations of the multi-passenger ride vehicle 12. In this manner, the vehicle controller 70 may control which passengers 16 control which operations of the multi-passenger ride vehicle 12. For example, in some embodiments, each user input device 34 may be coupled to a switch (not shown), and feedback from each user input device 34 may be provided to the vehicle controller 70 when the respective switch is closed and may not be provided to the vehicle controller 70 when the respective switch is open. Accordingly, the vehicle controller 70 may open the switch to deactivate the user input device 34 and may close the switch to activate the user input device 34.

In some embodiments, the vehicle controller 70 may activate or deactivate one or more user input devices 34 based on feedback from other user input devices 34. In some embodiments, the vehicle controller 70 may be configured to activate or deactivate one or more user input devices 34 that provide driving-related feedback (e.g., steering feedback, speed feedback, etc.) based on feedback from user input devices 34 that provide non-driving related feedback. For example, in one embodiment, the vehicle controller 70 may activate or deactivate the steering wheel 36, the gas pedal 38, the brake pedal 40, the one or more buttons 42, and/or the joystick 44 for one or more passengers 16 based on feedback from the buttons 42 of another passenger 16.

In some embodiments, the user input devices 34 may still be functional while deactivated. That is, deactivated user input devices 34 may be actuated by the passengers 16 and may provide feedback to the vehicle controller 70. However, in some embodiments, the vehicle controller 70 may still process the feedback from the deactivated user input devices 34 to determine passenger performance in controlling the respective user input devices 34. In certain embodiments, each user input device 34 may include a memory 102, which may store information relating to which passenger seat 14 the respective user input device 34 is disposed proximate to and/or information relating to which passenger 16 controls the respective user input device 34. For example, in one embodiment, the memory 102 may store a unique identifier that identifies the passenger seat 14 and/or the passenger 16 with which the respective user input device 34 is associated. Further, in some embodiments, the memory 102 may store information relating to the type of the user input device 34 (e.g., steering wheel, joystick, brake pedal, gas pedal, button, reward button, obstacle button, etc.) and/or the type or types of feedback generated by the user input device 34 (e.g., steering feedback, speed feedback, acceleration feedback, deceleration feedback, reward feedback, obstacle feedback, etc.). For example, in some embodiments, the multi-passenger ride vehicle 12 may include two buttons 42, and a first button of the two buttons 42 may provide feedback relating to rewards and a second button of the two buttons 42 may provide feedback relating to obstacles. Accordingly, in certain embodiments, the vehicle controller 70 may use information stored in the memory 102 of each user input device 34 to determine the passenger seat 14 associated with the user input device 34, the passenger 16 associated with the user input device 34, the type of user input device 34, and/or the type or types of feedback generated by the user input device 34 to selectively activate the user input devices 34. By way of example, the vehicle controller 70 may select a passenger 16 in a particular passenger seat 14 for control of obtaining rewards and may selectively activate a button 42 that is configured to provide reward feedback and is disposed proximate to the particular passenger seat 14.

Additionally, in some embodiments, the vehicle controller 70 may be configured to provide indications to the passengers 16 that may inform the passengers 16 of which user input devices 34 are activated. For example, in some embodiments, the user input devices 34 may include one or more indicators (not shown), and the vehicle controller 70 may selectively activate indicators of the activated user input devices 34. For example, the indicators may be lights (e.g., indicator lights, emitters), displays (e.g., displays that display graphics or text indicative of the activated user input devices 34), audio annunciators (e.g., speakers), and/or any other suitable indicator device. In this manner, the indicators may provide an indication to the passengers 16 regarding the activated user input devices 34.

In some embodiments, two or more of the passengers 16 may have the same type of user input devices 34 or may have user input devices 34 that provide the same type of feedback, such as feedback related to movement, feedback related to steering, feedback related to speed and/or acceleration, feedback related to awards, feedback related to obstacles, and so forth. For example, as illustrated in FIG. 1, the multi-passenger ride vehicle 12 may provide the steering wheel 36, the gas pedal 38, the brake pedal 40, the one or more buttons 42, and the joystick 44 for each passenger 16. In some embodiments, the vehicle controller 70 may only use feedback from one type of user input device 34 or one type of feedback at a time to control operations of the multi-passenger ride vehicle 12. For example, the vehicle controller 70 may selectively activate the steering wheel 36 proximate to a first passenger seat 14, the gas pedal 38 and the brake pedal 40 proximate to a second passenger seat 14, a first button 42 proximate to a third passenger seat 14, and a second button 44 proximate to a fourth passenger seat 14. It may be desirable to activate at least one user input device 34 for each passenger seat 14 to provide a dynamic and interactive experience for each passenger 16.

The vehicle controller 70 may also vary which user input devices 34 are activated throughout the ride. For example, after a predetermined time, after a predetermined distance traveled by the multi-passenger ride vehicle 12, or at a predetermined location in the ride course 30, the vehicle controller 70 may change which user input devices 34 are activated. The vehicle controller 70 may selectively activate different user input devices 34 based on a predetermined schedule (e.g., list or hierarchy), which may be stored in the memory 76, or based on previous passenger performance, which will be described in more detail below. It should be noted this embodiment is merely one possible option, and the vehicle controller 70 may activate the user input devices 34 in any desired combination, in any desired order, and for any desired length of time.

Additionally, in some embodiments, the vehicle controller 70 may use two or more inputs that include the same type feedback or are from the same type of user input device 34 to control operations of the multi-passenger ride vehicle 12. That is, the vehicle controller 70 may selectively activate two or more user input devices 34 of the same type or two or more user input devices 34 that provide the same type of feedback at the same time. For example, the vehicle controller 70 may selectively activate the steering wheel 36 proximate to a first passenger seat 14 and the steering wheel 36 proximate to a second passenger seat 14, and the vehicle controller 70 may combine (e.g., average, apply a weighted average, add, etc.) the feedback from the two activated steering wheels 36 into an aggregate signal to control the steering of the multi-passenger ride vehicle. Again, it should be noted this embodiment is merely one possible option, and the vehicle controller 70 may selectively activate the user input devices 34 in any desired combination, in any desired order, and for any desired length of time and may combine feedback from activated user input devices 34 in any desired manner. For example, in some embodiments, the vehicle controller 70 may weight the feedback based on prior passenger performance for controlling the particular user input device 34.

The interactive ride system 10 may include various components that may allow for interaction of the passengers 16 with the multi-passenger ride vehicle 12 and the ride environment 28. In some embodiments, the ride environment 28 may include separate control circuitry for facilitating interactive and dynamic ride elements. For example, the ride environment 28 may include a display module 104 configured to provide a projection or video display within the ride environment 28. For example, the display module 104 may include one or more projectors, which may be disposed about one or more locations along the ride course 30 or within the ride environment 28. The display or projection may be displayed on the walls, ceiling, and/or floor of the ride environment 28, displayed on the ride course 30, display on one or more physical objects in the ride environment, or a combination thereof. In certain embodiments, the display module 104 may display projections of virtual obstacles (e.g., potholes, speed bumps, cones, signs, blockades, barriers, vehicles, trees, rocks, characters, etc.), projections of virtual rewards (e.g., money, coins, gold, gas cans, speed boosting devices, wands, toy weapons, toy ammo, armor, cars, characters, food, etc.), characters of the interactive ride system 10, and a background or theme for the interactive ride system 10. In some embodiments, the display module 104 may display projections of virtual obstacles, projections of virtual rewards, characters of the interactive ride system 10, and/or a background or theme for the interactive ride system on one or more head mounted displays (HMDs) on board the multi-passenger ride vehicle 12 (e.g., HMDs worn by the passengers 16). Further, the ride environment 28 may include a sound module 106, such as one or more speakers configured to provide various audio effects. Additionally, the ride environment 28 may include a physical effects module 108 for controlling one or more physical effects, such as special effects and/or physical objects. For example, the special effects may include smoke, water, snow, fire, wind, ice, temperature effects, smells, etc. Further, the physical effects module 108 may be configured to add physical objects to the ride environment 28, remove physical objects from the ride environment 28, and/or move physical objects in the ride environment 28. The physical objects may include physical reward objects and physical obstacles, as well as other objects to provide visual interest for the ride environment 28.

One or more disclosed features of the ride environment 28 may additionally or alternatively be implemented in the multi-passenger ride vehicle 12. For example, speakers of the multi-passenger ride vehicle 12 may be controlled by the vehicle controller 70. Additionally, the multi-passenger ride vehicle 12 may include a display module 110 that may be controlled by the vehicle controller 70. The display module 110 may include one or more heads-up displays on a windshield of the multi-passenger ride vehicle 12, one or more liquid-crystal display (LCD) screens or touch-screen displays (e.g., disposed on the steering wheel 40), one or more projectors, one or more head mounted displays (HMDs), or a combination thereof. In some embodiments, the display module 110 may include a heads-up display, a LCD screen, a touch-screen display, a projector, a head mounted display (HMD), or a combination thereof, for each passenger 16. The one or more projectors may be disposed in, disposed on, and/or coupled to the multi-passenger ride vehicle 12. Further, the one or more projectors of the display module 110 may be configured to display projections on the walls, ceiling, and/or floor of the ride environment 28, on the ride course 30, on one or more physical objects in the ride environment 28, on another multi-passenger ride vehicle 12, or a combination thereof. Additionally, the one or more projectors, heads-up displays, LCD screens, touch-screen displays, and/or HMDs may be configured to cause display of virtual rewards and/or virtual obstacles, such as those described above.

Based on feedback from the vehicle controller 70 and/or the system controller 72, the display module 110 of the multi-passenger ride vehicle 12 may also display ride information. In some embodiments, the display module 110 may display indicators that may indicate which user input devices 34 are activated. For example, ride information may include an individual score for a passenger 16, which may be based on the passenger's performance in obtaining rewards, avoiding obstacles, steering the multi-passenger ride vehicle 12 (e.g., relative to a predetermined "ideal" path), engaging with other multi-passenger ride vehicles 12, or a combination thereof. Further, the ride information may include a team score for all passengers 16 in the multi-passenger ride vehicle 12, which may be based on each passenger's performance in obtaining rewards, avoiding obstacles, steering the multi-passenger ride vehicle 12 (e.g., relative to a predetermined "ideal" path), engaging with other multi-passenger ride vehicles 12, or a combination thereof. Further, the ride information may include a representation of the ride course 30 (e.g., a 2D dynamic graphical representation of the ride course 30 and vehicle position in the ride course 30, as well as any available interactive obstacles and/or rewards), and so forth.

Figure 3:
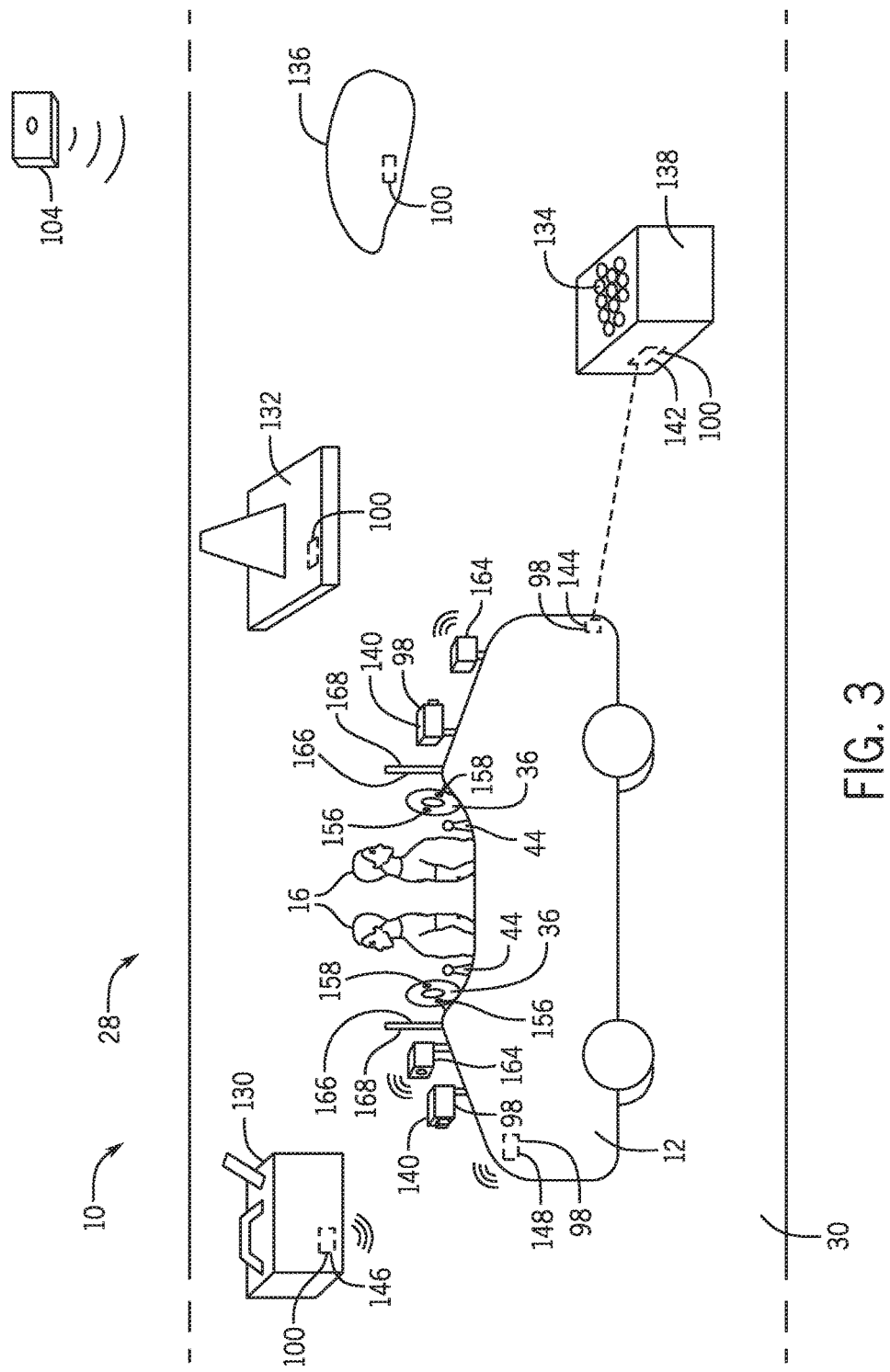
FIG. 3 is a perspective view of an interactive ride system including a multi-passenger ride vehicle, a physical reward, a virtual reward, a physical obstacle, and a virtual obstacle in accordance with present techniques.

As noted above, the ride environment 28 may include physical obstacles, physical rewards, virtual obstacles, and virtual rewards, and the passengers 16 may control one or more user input devices 34 to obtain the rewards and avoid the obstacles in the ride environment 28. For example, FIG. 3 illustrates an embodiment of the interactive ride system 10 including a physical reward 130, a physical obstacle 132, a virtual reward 134, and a virtual obstacle 136. It should be noted that the interactive ride system 10 may include any suitable number of physical rewards 130, physical obstacles 132, virtual rewards 134, and/or virtual obstacles 136. Additionally, it should be noted that the physical rewards 130, the physical obstacles 132, the virtual rewards 134, and/or the virtual obstacles 136 may be disposed about any suitable location of the ride environment 28, such as on the ride course 30, on a wall or barrier of the ride environment 28, and/or on one or more physical objects 138 in the ride environment 28. The physical rewards 130 and the virtual rewards 134 may include money, coins, gold, gas cans, speed boosting devices, wands, toy weapons, toy ammo, armor, cars, characters, food, etc. The physical obstacle 132 and the virtual obstacles 136 may include potholes, speed bumps, cones, signs, blockades, barriers, vehicles, trees, rocks, characters, etc. It should be appreciated that the physical rewards 130 and the physical obstacles 132 may be props representative of the particular reward or obstacle. In certain embodiments, the physical rewards 130 and the physical obstacles 132 may be provided by and/or moved by the physical effects module 108, which may be controlled by the system controller 72. In some embodiments, the virtual rewards 134 and the virtual obstacles 136 may be displayed by the display module 104 of the ride environment 28. Further, as will be described in more detail below, in some embodiments, the virtual rewards 134 and the virtual obstacles 136 may be displayed by the display module 110 of the multi-passenger ride vehicle 12.

In some embodiments, the passengers 16 may collect or obtain the physical rewards 130 and the virtual rewards 134 by steering the multi-passenger ride vehicle 12 toward the physical rewards 130 and the virtual rewards 134 using one or more user input devices 34, such as the steering wheel 36 and/or the joystick 44. For example, the vehicle controller 70 may determine that the multi-passenger ride vehicle 12 (or the one or more passengers 16 controlling the steering) has obtained the reward when the multi-passenger ride vehicle 12 is in within a predetermined distance of, contacts, or passes over the physical reward 130 or the virtual reward 134. Accordingly, in some embodiments, the vehicle controller 70 may determine the distance between the multi-passenger ride vehicle 12 and a reward, which will be described in more detail below, compare the distance to a reward distance threshold (e.g., stored in the memory 76), and may determine whether the reward is obtained based on the comparison. In particular, the vehicle controller 70 may determine that the reward is obtained in response to a determination that the distance between the multi-passenger ride vehicle 12 and the reward is less than the reward distance threshold. Conversely, the vehicle controller 70 may determine that the reward is not obtained in response to a determination that the multi-passenger ride vehicle 12 passed the reward on the ride course 30 and the distance between the multi-passenger ride vehicle 12 and the reward was greater than the reward distance threshold.

Further, in some embodiments, the passengers 16 may avoid the physical obstacles 132 and the virtual obstacles 136 by steering the multi-passenger ride vehicle 12 away from the physical obstacles 132 and the virtual obstacles 136 using one or more user input devices 34, such as the steering wheel 36 and/or the joystick 44. For example, the vehicle controller 70 may determine that the multi-passenger ride vehicle 12 (or the one or more passengers 16 controlling the steering) has avoided the physical obstacle 132 or the virtual obstacle 136 if the multi-passenger ride vehicle 12 passed the physical obstacle 132 or the virtual obstacle 136 on the ride course 30 and did not come within a predetermined distance of, did not contact, or did not pass over the physical obstacle 132 or the virtual obstacle 136. For example, the vehicle controller 70 may determine a distance between the multi-passenger ride vehicle 12 and an obstacle and may monitor the distance as the multi-passenger ride vehicle 12 approaches and passes the obstacle on the ride course 30. In some embodiments, the vehicle controller 12 may determine that an obstacle is avoided in response to a determination that the distance between the multi-passenger ride vehicle 12 and the obstacle as the multi-passenger ride vehicle 12 approached and passed the obstacle was greater than an obstacle distance threshold, which may be stored in the memory 102. Further, the vehicle controller 70 may determine that an obstacle was not avoided in response to a determination that the distance between the multi-passenger ride vehicle 12 and an obstacle was less than the obstacle distance threshold.

Additionally, in certain embodiments, the vehicle controller 12 may compare the distance between the multi-passenger ride vehicle 12 and an obstacle to a second obstacle distance threshold, which may be stored in the memory 102, to determine when the multi-passenger ride vehicle 12 is approaching the obstacle and when the multi-passenger ride vehicle 12 has passed the obstacle. For example, the vehicle controller 12 may determine that the multi-passenger ride vehicle 12 is approaching the obstacle when the distance is less than the second obstacle distance threshold and may determine that the multi-passenger ride vehicle 12 has passed the obstacle when the distance is greater than the second obstacle distance threshold. In this manner, the vehicle controller 70 may only identify avoided obstacles that the multi-passenger ride vehicle 12 encountered.

To determine the position of the multi-passenger ride vehicle 12 relative to the physical rewards 130, physical obstacles 132, virtual rewards 134, and virtual obstacles 136, the vehicle controller 70 may use feedback from one or more sensors 98 of the multi-passenger ride vehicle 12 and/or feedback from one or more sensors 100 of the ride environment 28. For example, in some embodiments, the sensors 98 of the multi-passenger ride vehicle 12 may include one or more cameras 140. The one or more cameras 140 may be mounted to, disposed in, or integral with the multi-passenger ride vehicle 12, and may be disposed about any location of the multi-passenger ride vehicle 12. Accordingly, the vehicle controller 70 may process signals from the one or more cameras 140 to detect when awards are obtained and when obstacles are avoided.

Further, in some embodiments, the sensors 98 of the multi-passenger ride vehicle 12 may interact with the sensors 100 of the ride environment 28, which may be disposed proximate to, in, or on the physical rewards 130, physical obstacles 132, virtual rewards 134, and/or virtual obstacles 136. For example, the one or more sensors 100 may include one or more emitters 142, and the sensors 100 may include one or more detectors 144. The one or more detectors 144 may be disposed in or on the multi-passenger ride vehicle 12 and may detect light from the one or more emitters 142 when the one or more emitters 142 are within a predetermined distance of and/or in line with the one or more detectors 144. In the illustrated embodiment, one emitter 142 is disposed in or on the physical object 138 and is proximate to the virtual reward 134. However, the one or more emitters 142 may additionally or alternatively be disposed in, on, or proximate to the physical rewards 130, the physical obstacles 132, and/or the virtual obstacles 136. Further, it should be noted that in some embodiments, the sensors 98 may additionally or alternatively include the emitters 142, and the sensors 100 may include the detectors 144.

Additionally, in some embodiments, the one or more sensors 100 may additionally or alternatively include one or more radio-frequency identification (RFID) tags 146, and the sensors 98 may include one or more RFID readers 148. The RFID readers 148 may be mounted to, disposed in, or integral with the multi-passenger ride vehicle 12 and may detect signals from the one or more RFID tags 146 when the multi-passenger ride vehicle 12 is within a predetermined distance of the one or more RFID tags 146. As illustrated, one RFID tag 146 may be disposed in the physical reward 142. However, the one or more RFID tags 146 may additionally or alternatively be disposed additionally or alternatively be disposed in, on, or proximate to the virtual rewards 134, the physical obstacles 132, and/or the virtual obstacles 136. Further, it should be noted that in some embodiments, the sensors 98 may additionally or alternatively include the RFID tags 146 and the sensors 100 may additionally or alternatively include the RFID readers 148.

In some embodiments, the RFID tags 146 may transmit a signal that includes identification information for the object (e.g., physical reward 130, physical obstacle 132, virtual reward 134, or virtual obstacle 136) with which the respective RFID tag 146 is associated (e.g., disposed in, disposed on, or proximate to). For example, the signal may include information identifying the type of the object as reward or obstacle. In some embodiments, the signal may also include information identifying whether the object is physical or virtual. Further, in some embodiments, the signal may include information associated with a level of difficulty in obtaining or avoiding the particular object, a score for obtaining or avoiding the particular object, a status of the particular object (e.g., active/points awarded for obtaining or avoiding or inactive/points not awarded for obtaining or avoiding), and so forth. Accordingly, the RFID reader 148 may receive the information from the RFID tag 146, decode the information if the information is encoded, and provide the information to the vehicle controller 70.

The vehicle controller 70 may receive signals from the sensors 98 (e.g., the emitters 142, the detectors 144, the RFID tags 146, and/or the RFID readers 148), signals from the sensors 100 (e.g., the emitters 142, the detectors 144, the RFID tags 146, and/or the RFID readers 148), signals from the system controller 72, or a combination thereof. The vehicle controller 70 may use the received signals to determine the proximity of the multi-passenger ride vehicle 12 relative to one or more physical rewards 130, physical obstacles 132, virtual rewards 134, and/or virtual obstacles 136. Further, the vehicle controller 70 may determine whether rewards are obtained and whether obstacles are avoided based at least in part on the proximity of the multi-passenger ride vehicle 12 relative to one or more physical rewards 130, physical obstacles 132, virtual rewards 134, and/or virtual obstacles 136. Additionally, in embodiments in which the RFID tags 146 include information about the particular object that the respective RFID tag 146 is associated with, the vehicle controller 70 may use the information from the RFID tags 146 in the determination of whether rewards are obtained and obstacles are avoided.

In some embodiments, the passengers 16 of the multi-passenger ride vehicle 12 may obtain the reward and avoid the obstacles by steering the multi-passenger ride vehicle 12 toward the rewards and away from the obstacles, respectively, using one or more user input devices 34, and by interacting with one or more different user input devices 34 to provide confirmation to the vehicle controller 70 that the reward or obstacle was identified by one or more passengers 16. For example, the buttons 42 of the multi-passenger ride vehicle 12 may include a reward button 156 and an obstacle button 158. A passenger 16 may depress or actuate the reward button 156 when the passenger 16 identifies a reward in the ride environment 28, and the reward button 156 may provide reward feedback to the vehicle controller 70 in response to depression of the reward button. Similarly, a passenger 16 may depress or actuate the obstacle button when the passenger 16 identifies an obstacle in the ride environment 28, and the obstacle button 158 may be configured to provide obstacle feedback to the vehicle controller 70 in response to depression of the obstacle button 158. The reward button 156 and the obstacle button 158 may be disposed on the steering wheel 36 or any other suitable location of the multi-passenger ride vehicle 12. Further, any suitable user input device 34 may be used to receive a user input regarding identified awards or obstacles, such as, for example, a switch, a lever, a portion of a touch-screen display, and so forth.

In certain embodiments, the vehicle controller 70 may determine that the multi-passenger ride vehicle 12 and/or the passengers 16 controlling the steering and interacting with the reward button 156 have obtained a reward in response to a determination that the multi-passenger ride vehicle 12 is within a predetermined distance of the reward and a determination that the reward button 156 was pressed (e.g., when the multi-passenger ride vehicle 12 was within the predetermined distance of the award). In some embodiments, the vehicle controller 70 may determine that the multi-passenger ride vehicle 12 and/or the passengers 16 controlling the steering and interacting with the obstacle button 158 have avoided an obstacle in response to a determination that the multi-passenger ride vehicle 12 was at least a predetermined distance away from an obstacle and a determination that the obstacle button 158 was pressed (e.g., when the multi-passenger ride vehicle 12 was a predetermined distance away from the obstacle). Providing the reward button 156 and the obstacle button 158 may provide a dynamic interactive experience for at least two passengers 16. For example, a first passenger 16 may control the steering (e.g., via the steering wheel 36 or the joystick 44), a second passenger 16 may control the reward button 156, and third passenger 16 may control the obstacle button 158.

Additionally, the passengers 16 may interact with one or more user input devices 34 to cause display of the virtual reward 134 and/or the virtual obstacles 136. In some embodiments, the vehicle controller 70 may cause the display module 110 of the multi-passenger ride vehicle 12 to display the virtual reward 134 and/or the virtual obstacle 136 based on feedback from one or more user input devices 34. For example, the vehicle controller 70 may cause the display module 110 to display the virtual reward 134 in response to feedback from the reward button 156 and to display the virtual obstacle 136 in response to feedback from the obstacle button 158. The reward button 156 and the obstacle button 158 may provide a dynamic interactive experience for at least two passengers 16. For example, one passenger 16 may control display of the virtual reward 134 and/or the virtual obstacle 136 via the reward button 156 and/or the obstacle button 158, respectively, and other passengers 16 may control other user input devices 34 to obtain the virtual reward 134 and/or the avoid the virtual obstacle 136. It should be appreciated that any suitable user input device 34 or user input devices 34 may be used to control the display of the virtual reward 134 and/or the virtual obstacle 134, such as a second reward button, a second obstacle button, levers, switches, areas of a touch-screen display, and so forth.

In some embodiments, the display module 110 of the multi-passenger ride vehicle 12 may include one or more projectors 164 to display the virtual reward 134 and the virtual obstacle 136. The one or more projectors 164 may be mounted on, disposed in, or integral with the multi-passenger ride vehicle 12. In some embodiments, the one or more projectors 164 may be disposed in the ride environment 28 and operatively coupled to the vehicle controller 70. In certain embodiments, the multi-passenger ride vehicle 12 may include at least one projector 164 for each passenger 16, which may be proximal to the respective passenger seat 14. For example, in one embodiment, the multi-passenger ride vehicle 12 may include a first projector 164 for each passenger 16 that is configured to display virtual rewards 134 and a second projector 164 for each passenger 16 that is configured to display virtual obstacles 136. In this manner, each passenger 16 may independently cause display of a virtual reward 134, a virtual obstacle 136, or both. Accordingly, the vehicle controller 12 may select a projector 164 from the one or more projectors 164 and cause the selected projector 164 to display a virtual reward 134 or a virtual obstacle 136 based on feedback from a user input device 34 (e.g., a reward button 156, an obstacle button 158, etc.) when a passenger 16 actuates the user input device 34 and based on information from the memory 102 of the respective user input device 34, such as the type of the user input device 34 (e.g., a reward button 156 or an obstacle button 158), the type of feedback from the user input device 34 (e.g., reward feedback or obstacle feedback), the passenger seat 14 associated with the user input device 34, the passenger 16 associated with the user input device, or a combination thereof.

In certain embodiments, the vehicle controller 70 may be configured to deactivate or turn off the projectors 164 to cease display of the virtual reward 134 or virtual obstacle 136 after a predetermined time and/or in response to feedback from the user input device 34 (e.g., the reward button 156 or the obstacle button 158). Further, the vehicle controller 70 may periodically or continuously adjust a position and/or orientation of the projectors 164, such that the position of the virtual reward 134 and the virtual obstacle 136 relative to the multi-passenger ride vehicle 12 changes over time, which may increase interest and difficulty in obtaining the virtual reward 134 and avoiding the virtual obstacle 136. For example, the position and/or orientation of a projector 164 may be adjusted after each depression of the reward button 156, each depression of the obstacle button 158, each time the virtual reward 134 is obtained, or each time the virtual obstacle 136 is avoided. Further, in some embodiments, the vehicle controller 70 may be configured to adjust the position and/or orientation of a projector 164 based on feedback from a user input device 34. For example, a passenger 16 may control a joystick 44 to control adjust the position and/or orientation of the projector 164.

In some embodiments, the display module 110 may include one or more heads-up displays 166, which may be displayed on one or more windshields 168 of the multi-passenger ride vehicle 12. For example, the vehicle controller 70 may cause one or more of the head-up displays 166 to display a virtual reward 134 or a virtual obstacle 136 based on feedback from one or more user input devices 34. In certain embodiments, the multi-passenger ride vehicle 12 may include one heads-up display 166 for each passenger 16, which may be proximal to the respective passenger seat 14. Accordingly, the vehicle controller 12 may select a heads-up display 166 from the one or more heads-up displays 166 and cause the selected heads-up display 166 to display a virtual reward 134 or a virtual obstacle 136 based on feedback from a user input device 34 (e.g., a reward button 156, an obstacle button 158, etc.) when a passenger 16 actuates the user input device 34 and based on information from the memory 102 of the respective user input device 34, such as the type of the user input device 34 (e.g., a reward button 156 or an obstacle button 158), the type of feedback from the user input device 34 (e.g., reward feedback or obstacle feedback), the passenger seat 14 associated with the user input device 34, the passenger 16 associated with the user input device, or a combination thereof.

Further, in some embodiments, the vehicle controller 70 may cause the display module 104 of the ride environment 28 to display the virtual reward 134 or the virtual obstacle 136 based on feedback from one or more user input devices 34, such as the reward button 156 or the obstacle button 158). For example, the vehicle controller 70 may send instructions to the system controller 72, which may cause the display module 104 (e.g., one or more projectors of the display module 104) to display the virtual reward 134 or the virtual obstacle 136. In some embodiments, the display module 104 may include a plurality of projectors disposed in a plurality of locations about the ride environment 28 and/or the ride course 30, and the system controller 72 and/or the vehicle controller 70 may select a projector from the plurality of projectors of the display module 104 to display the virtual reward 134 and/or the virtual obstacle 136 based on feedback from one or more user input devices 34. In certain embodiment, the system controller 70 and/or the vehicle controller 70 may select a projector from the plurality of projectors that is disposed proximate to (e.g., within a predetermine distance of, closest to) the multi-passenger ride vehicle 12 that generated the feedback to display the virtual reward 134 or the virtual obstacle 136. In some embodiments, the system controller 70 and/or the vehicle controller 70 may select a projector from the plurality of projectors that is disposed proximate to (e.g., within a predetermine distance of, closest to) another multi-passenger ride vehicle 12 that did not generate the feedback to display the virtual reward 134 or the virtual obstacle 136. For example, a passenger 16 in a first multi-passenger ride vehicle 12 may press the obstacle button 158 to cause display of a virtual obstacle 136, and the system controller 72 and/or the vehicle controller 70 may cause a projector of the plurality of projectors that is proximate to a second multi-passenger ride vehicle 12 (e.g., competing with the first multi-passenger ride vehicle 12) to display the virtual obstacle 136 (e.g., in the path of the second multi-passenger ride vehicle 12).

As described in detail above, the vehicle controller 70 may determine that a reward is obtained when the multi-passenger ride vehicle is within a predetermined distance of the reward. When the vehicle controller 70 determines that a reward is obtained, the vehicle controller 70 may award one or more points to the multi-passenger ride vehicle 12, which may be added to a team score for all passengers 16 in the multi-passenger ride vehicle 12. In some embodiments, the vehicle controller 70 may award one or more points to the passengers 16 who controlled various input devices 34, such as the steering wheel 40, the joystick 44, and/or the reward button 156, which were used to obtain the reward. Additionally, in embodiments in which a passenger 16 caused display of a virtual reward 134 that was obtained by the multi-passenger ride vehicle 12, the vehicle controller 12 may award one or more points to the passenger 16 who caused display of the virtual reward 134 and the one or more passengers 16 who controlled various user input devices 34 to obtain the virtual reward 134. For example, the one or more points awarded to the passengers 16 may be added to an individual score for the respective passenger 16. In some embodiments, the number of points awarded may be based on a level of difficulty for obtaining the reward, which may be determined by the vehicle controller 70.

Further, in some embodiments, the vehicle controller 70 may increase one or more performance characteristics of the multi-passenger ride vehicle 12, "unlock" one or more features of the multi-passenger ride vehicle 12, "unlock" one or more features of the interactive ride system 10, activate or deactivate one or more user input devices 34 (e.g., driving-related user input devices 34) of the multi-passenger ride vehicle 12, or a combination thereof, when a reward is obtained. For example, the vehicle controller 70 may increase a maximum speed of the multi-passenger ride vehicle 12, decrease a turning radius of the multi-passenger ride vehicle 12, provide temporary, virtual "armor" for the multi-passenger ride vehicle 12 to protect against obstacles and actions from other multi-passenger ride vehicles 12, allow the multi-passenger ride vehicle 12 to access new sections of the ride course 30, and so forth. In one embodiment, the vehicle controller 70 may activate a driving-related input device 34 (e.g., the steering wheel 36, the gas pedal 38, the brake pedal 40 and/or the joystick 44) for a passenger 16 if the passenger 16 actuated a user input device 34 (e.g., the reward button 156) that was used to obtain a reward.

Additionally, as noted above, the vehicle controller 70 may determine that an obstacle is avoided in response to a determination that the multi-passenger ride vehicle 12 passed an obstacle on the ride course 30 and was a predetermined distance away from the obstacle. When the vehicle controller 70 determines that an obstacle was avoided, the vehicle controller 70 may award one or more points to the multi-passenger ride vehicle 12, which may be added to a team score for all passengers 16 in the multi-passenger ride vehicle 12. In some embodiments, the vehicle controller 70 may award one or more points to the passengers 16 who controlled various input devices 34, such as the steering wheel 40, the joystick 44, and/or the obstacle button 158, which were used to avoid the obstacle. Additionally, in embodiments in which a passenger 16 caused display of a virtual obstacle 136 that was avoided by the multi-passenger ride vehicle 12, the vehicle controller 12 may award one or more points to the passenger 16 who caused display of the virtual obstacle 136 and the one or more passengers 16 who controlled various user input devices 34 to avoid the virtual obstacle 136. As noted above, the one or more points awarded to the passengers 16 may be added to an individual score for the respective passenger 16. Further, the number of points awarded may be based on a level of difficulty for avoiding the obstacle, which may be determined by the vehicle controller 70. Additionally, similar to obtained rewards, the vehicle controller 70 may increase one or more performance characteristics of the multi-passenger ride vehicle 12 and/or may activate or deactivate one or more user input devices 34 (e.g., driving-related user input devices 34) of the multi-passenger ride vehicle 12 when an obstacle is avoided. In one embodiment, the vehicle controller 70 may activate a driving-related input device 34 (e.g., the steering wheel 36, the gas pedal 38, the brake pedal 40 and/or the joystick 44) for a passenger 16 if the passenger 16 actuated a user input device 34 (e.g., the obstacle button 158) that was used to avoid an obstacle.

In certain embodiments, when the multi-passenger ride vehicle 12 does not avoid an obstacle, the vehicle controller 70 may subtract points from the team score and/or from individual scores of one or more passengers 16. Additionally, in some embodiments, when the multi-passenger ride vehicle 12 does not avoid an obstacle, the vehicle controller 70 may decrease one or more performance characteristics of the multi-passenger ride vehicle 12 and/or may activate or deactivate one or more user input devices 34 (e.g., driving-related user input devices 34) of the multi-passenger ride vehicle 12. For example, the vehicle controller 70 may decrease a maximum speed of the multi-passenger ride vehicle 12, cause the multi-passenger ride vehicle 12 to spin, cause the multi-passenger ride vehicle 12 to react as if it hit the obstacle, and so forth. Further, for competing rides, the vehicle controller 70 may award one or more points to a first passenger 16 that caused display of the virtual obstacle 136 if one or more other passengers 16, who may be in the same multi-passenger ride vehicle 12 or a different multi-passenger ride vehicle 12 as the first passenger 16, do not avoid the virtual obstacle 238. In one embodiment, the vehicle controller 70 may deactivate a driving-related input device 34 (e.g., the steering wheel 36, the gas pedal 38, the brake pedal 40 and/or the joystick 44) for a passenger 16 if the passenger 16 actuated a user input device 34 (e.g., the obstacle button 158) to display a virtual obstacle 136 and failed to avoid the virtual obstacle 136. In some embodiments, the vehicle controller 70 may activate a driving-related input device 34 (e.g., the steering wheel 36, the gas pedal 38, the brake pedal 40 and/or the joystick 44) for a passenger 16 if the passenger 16 actuated a user input device 34 (e.g., the obstacle button 158) to display a virtual obstacle 136 and other passengers 16 failed to avoid the virtual obstacle 136.

Figure 4:
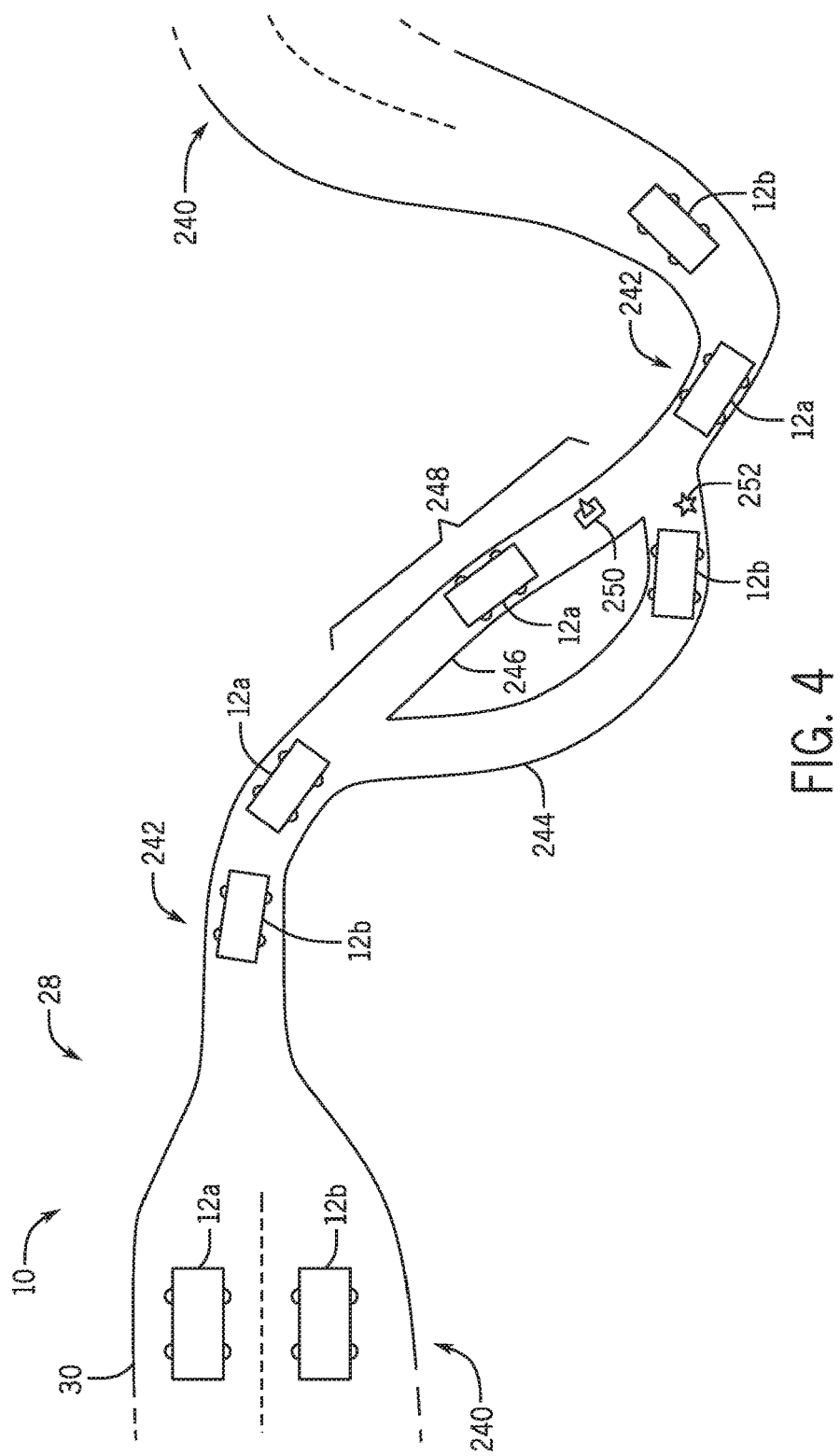
FIG. 4 is a perspective view of an interactive ride system including two multi-passenger ride vehicles in accordance with present techniques.

As noted above, the interactive ride system 10 may include two or more multi-passenger ride vehicles 12. In particular, the interactive ride system 10 may include two or more multi-passenger ride vehicles 12 on the ride course 30 at the same time to provide competing rides or races between the two or more multi-passenger ride vehicles 12. For example, as illustrated in FIG. 4, the interactive ride system 10 may include a first multi-passenger ride vehicle 12a and a second multi-passenger ride vehicle 12b configured to race one another along the ride course 30. In particular, FIG. 4 illustrates possible positions of the first and second multi-passenger ride vehicles 12a and 12b along the ride course 30 during a possible race. In some embodiments, the first and second multi-passenger ride vehicles 12a and 12b may be dispatched at the same time from the same location on the ride course 30, which may provide a realistic race experience. In certain embodiments, the first and second multi-passenger ride vehicles 12a and 12b may begin the ride at the same time from different locations on the ride course 30 or may begin the ride at different times from the same location or different locations along the ride course 30. While the illustrated embodiment includes two multi-passenger ride vehicles 12, it should be appreciated that the interactive ride system 10 may include any number of multi-passenger ride vehicles 12 along the ride course 30, such as 3, 4, 5, 6, 7, 8, 9, 10, or more. For example, in some embodiments, two or more multi-passenger ride vehicles 12 may be dispatched at the same time from the same location at predetermined intervals to space out groups of racing multi-passenger ride vehicles 12. In other embodiments, one multi-passenger ride vehicle 12 may be dispatched at a time.

The ride course 30 may include one or more multi-lane sections 240 to enable two or more multi-passenger vehicles 12 to race side-by-side and to pass one another to change positions in the race. The ride course 30 may also include one or more single-lane sections 242. Further, the ride course 30 may include one or more branches 244 that may branch off from and rejoin a main path 246 of the ride course 30. As such, the one or more branches 244 may bypass a section 248 of the main path 246. The branches 244 may be single-lane or multi-lane.

By providing the branches 244, the ride course 30 may include a plurality of unique paths that may be selected by the passengers 16 using the user input devices 34. This may enable each multi-passenger ride vehicle 12 to take a different path and may enable each passenger 16 to take a different path each time the ride is taken. Further, the branches 244 may include different rewards, obstacles, characters, and/or other ride elements from the bypassed sections 248. Accordingly, the user input devices 34 and the ride course 30 provide a unique, dynamic, and interactive experience for each passenger 16.

In some embodiments, the bypassed sections 248 may be single-lane sections 242. As such, the branches 244 may enable a multi-passenger ride vehicle 12 to pass another multi-passenger ride vehicle 12 in a single-lane section 242. For example, as illustrated, the first multi-passenger ride vehicle 12a may be ahead of the second multi-passenger ride vehicle 12b in a single-lane section 242 before a branch 244, and the passengers 16 in the second multi-passenger ride vehicle 12b may steer the second multi-passenger ride vehicle 12b through the branch 244 to pass the first multi-passenger ride vehicle 12a. Accordingly, the passengers 16 of a multi-passenger ride vehicle 12 may choose to travel through a branch 244 to try to pass another multi-passenger ride vehicle 12. Further, the passengers 16 of a multi-passenger ride vehicle 12 may choose to travel through the branch 244 to try to avoid obstacles 250 in the bypassed section 248 and/or to try to obtain rewards 252 in the branch 244. It should be appreciated that in some embodiments, the passengers 16 may not know the layout of the race course 30 or where rewards and obstacles are located, but may attempt to select an "ideal" path. For example, compared to "non-ideal" paths, an "ideal" path may enable a multi-passenger ride vehicle 12 to have the fastest race time, the highest number of obtained rewards, and the lowest number of encountered obstacles (or the highest number of avoided obstacles if passengers 16 are awarded points for avoiding obstacles).

Figure 5:
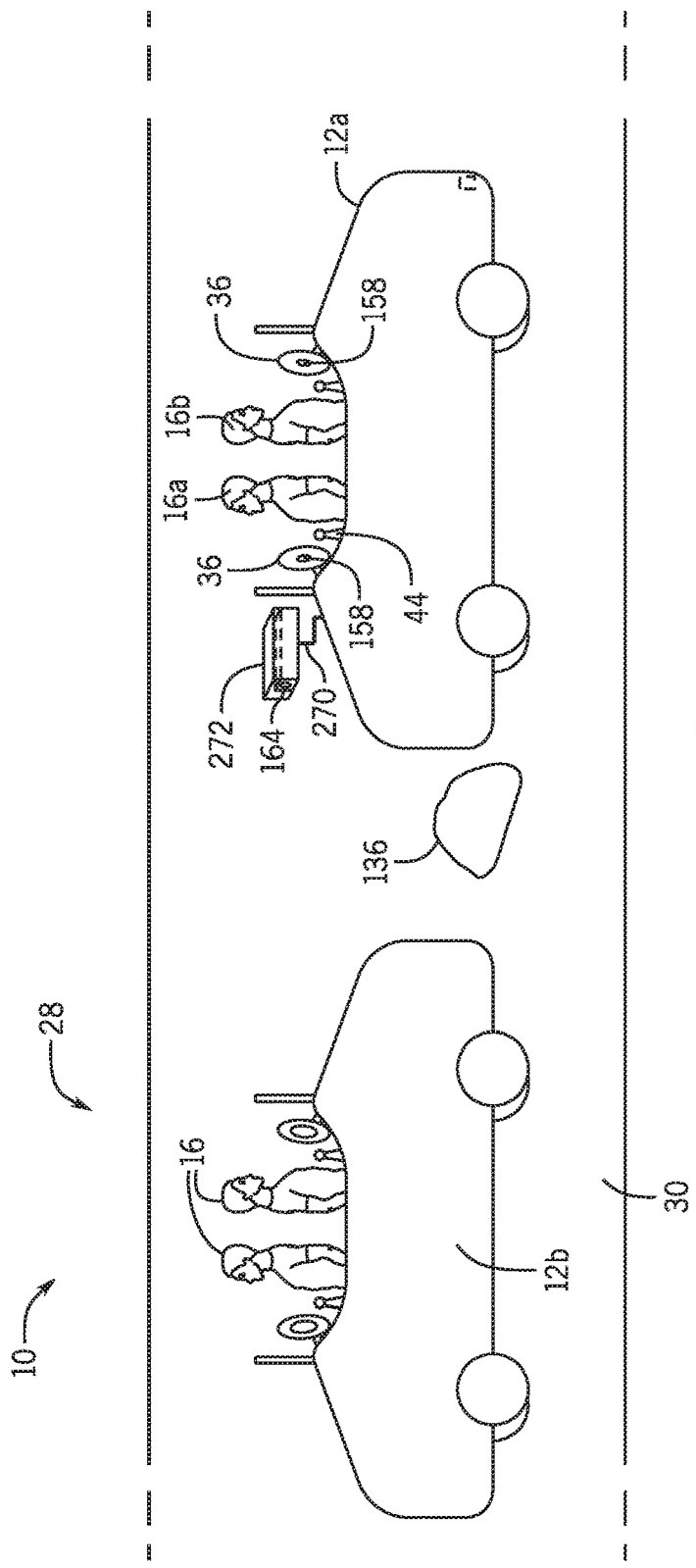
FIG. 5 is a perspective view of an interactive ride system including two multi-passenger ride vehicles and a virtual obstacle displayed by a moveable projector in accordance with present techniques.

Additionally, for competing rides or races, the passengers 16 of a multi-passenger ride vehicle 12 cause display of virtual obstacles 136 proximate to another multi-passenger ride vehicle 12. For example, as described in detail above, a passenger 16 in the first multi-passenger ride vehicle 12a may press the obstacle button 158, or any other suitable user input device 34, to cause a projector 164 to display a virtual obstacle 136. Further, as noted above, the passenger 16, or another passenger 16 in the first multi-passenger ride vehicle 12a, may control another user input device 34, such as the joystick 44, to control movement of the projector 164 and, as a result, the location of the virtual obstacle 136. For example, as illustrated in FIG. 5, the first multi-passenger ride vehicle 12a may include the projector 164 and an electronically-controlled actuator 270 configured to rotate and/or adjust a position of the projector 164. For example, the electronically-controlled actuator 270 may include a robotic arm. In some embodiments, the projector 164 may be disposed in a housing 272, and the electronically-controlled actuator 270 may be coupled to and configured to rotate and/or adjust a position of the housing 272. In other embodiments, the electronically-controlled actuator 270 may be directly coupled to the projector 164. The projector 164 and the housing 272, if included, may be disposed in or on the first multi-passenger ride vehicle 12a or may be coupled to the first multi-passenger ride vehicle 12a (e.g., via the electronically-controlled actuator 270). Further, as noted above, in some embodiments, the vehicle controller 70 and/or the system controller 72 may cause a projector of the display module 104 in the ride environment 28 to display virtual obstacles 136 in the path of competing multi-passenger ride vehicles 12 based on feedback from other multi-passenger ride vehicles 12.

To control movement of the projector 164, a passenger 16 (e.g., passenger 16a) may move the joystick 44, which may provide feedback to the vehicle controller 70 based on the movement. The vehicle controller 70 may control movement of the electronically-controlled actuator 270 based on the feedback from the joystick 44 to control the movement of the projector 164. In this manner, the joystick 44 may provide a unique and interactive experience for the passenger 16 controlling the joystick 44 by providing the passenger 16 with control over the placement of the virtual obstacle 136. Further, in some embodiments, one passenger 16 (e.g., passenger 16a) may control the joystick 44 to control the movement of the projector 164 and another passenger (e.g., passenger 16b) may control the obstacle button 158 to control display of the virtual obstacle 136, which may provide a unique and interactive experience for at least two passengers. While the illustrated embodiment includes one moveable projector 164, in other embodiments, the multi-passenger ride vehicle 12 may include a projector 164 and an electronically-controlled actuator 270 to move the respective projector 164 for two or more passengers 16 or each passenger 16.

Figure 6:
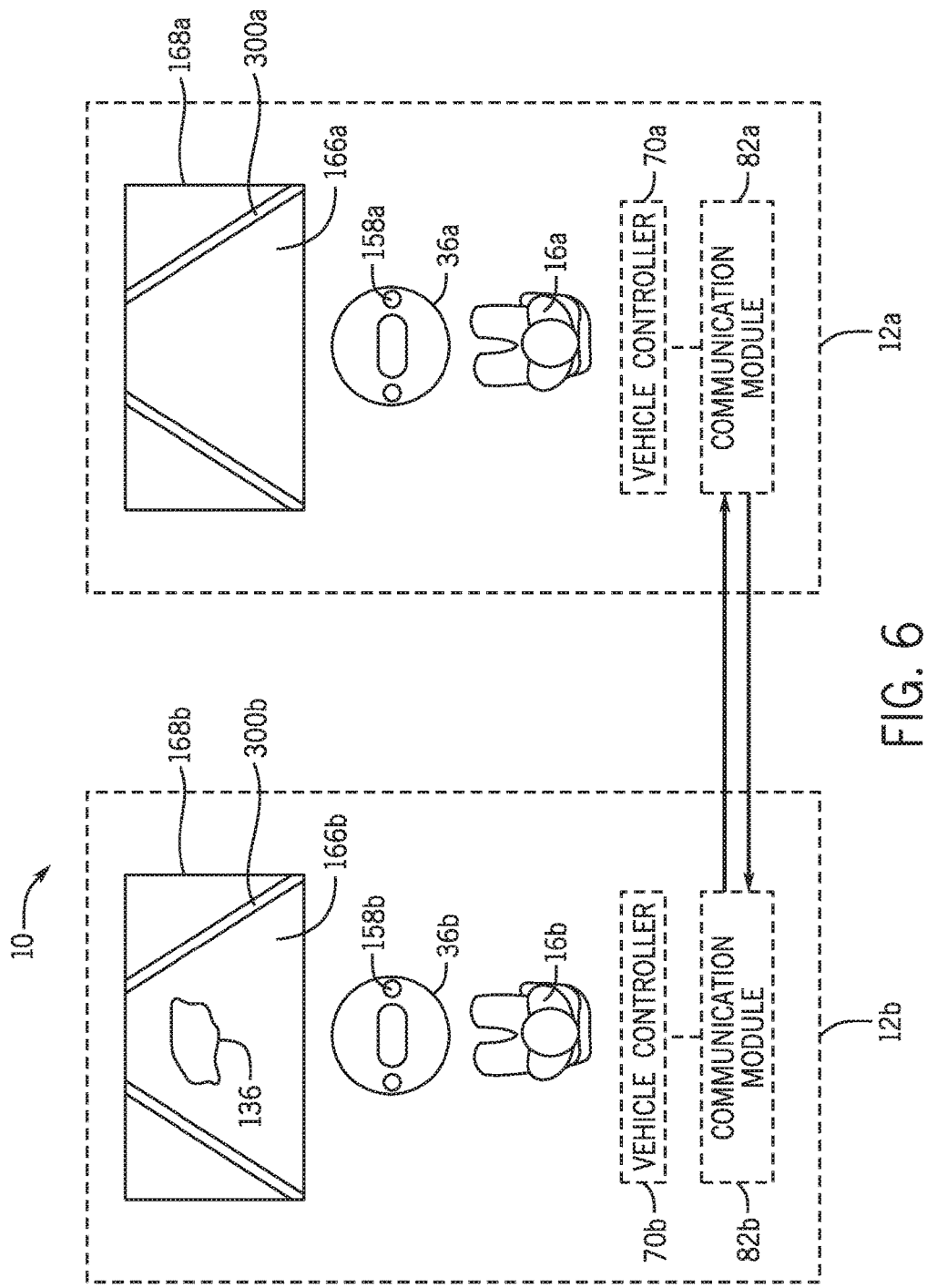
FIG. 6 is a schematic diagram of a representation of a virtual obstacle displayed on a heads-up display of a multi-passenger ride vehicle in accordance with present techniques.

Additionally, as noted above, the virtual obstacle 136 may be displayed on a heads-up display 166 of a multi-passenger ride vehicle 12. For example, as illustrated in FIG. 6, the first and second multi-passenger ride vehicles 12a and 12b may each include at least one windshield 168 (e.g., first and second windshields 168a and 168b, respectively) with at least one heads-up display 166 (e.g., first and second heads-up displays 166a and 166b, respectively). The first and second heads-up displays 166a and 166b may display first and second graphical representations 280a and 280b, respectively, of the ride course 30. In particular, a first vehicle controller 70a of the first multi-passenger ride vehicle 12a may cause the first heads-up display 166a to display the first graphical representation 280a based on feedback from the cameras 140, the sensors 98 of the multi-passenger ride vehicle 12a, the sensors 100 of the ride environment 28, and/or the system controller 72. Similarly, a second vehicle controller 70b of the second multi-passenger ride vehicle 12b may cause the second heads-up display 170b to display the second graphical representation 280b based on feedback from the cameras 140, the sensors 98 of the multi-passenger ride vehicle 12b, the sensors 100 of the ride environment 28, and/or the system controller 72.

As noted above, a passenger 16 may depress or actuate the obstacle button 158 to cause display of the virtual obstacle 136 on a heads-up display 166. In some embodiments, actuation of the obstacle button 158 may cause display of the virtual obstacle 136 on a heads-up display 166 of another multi-passenger ride vehicle 12. For example, a first passenger 16a of the first multi-passenger ride vehicle 12a may actuate a first obstacle button 158a, which may provide feedback to the first vehicle controller 70a. The first vehicle controller 70a may send a signal to the second vehicle controller 70b based on the input from first obstacle button 158a. In particular, the first vehicle controller 70a may send a signal to the second vehicle controller 70b via the first and second communication modules 82a and 82b, and the signal may include instructions that, when executed by the second vehicle controller 70b, cause display of the virtual obstacle 136 on the second heads-up display 166b.

As described in detail above, passengers 16 of the multi-passenger ride vehicle 12 may use one or more user input devices 34 to control operation of the multi-passenger ride vehicle 12. For example, each passenger 16 may operate and/or actuate one or more user input devices 34, such as the steering wheel 36, the gas pedal 38, the brake pedal 40, the buttons 42 (e.g., the reward button 136 and the obstacle button 138), the joystick 44, or a combination thereof. Further, the user input devices 34 may generate feedback in response to actuation by a passenger 16. The vehicle controller 70 may receive feedback from the user input devices 34 in response to actuation of the respective user input device 34, and the vehicle controller 70 may use the feedback to control one or more operations of the multi-passenger ride vehicle 12, such as movement of the multi-passenger ride vehicle 12, interaction with rewards, interaction with obstacles, interaction with other multi-passenger ride vehicles 12, or a combination thereof.

Figure 7:
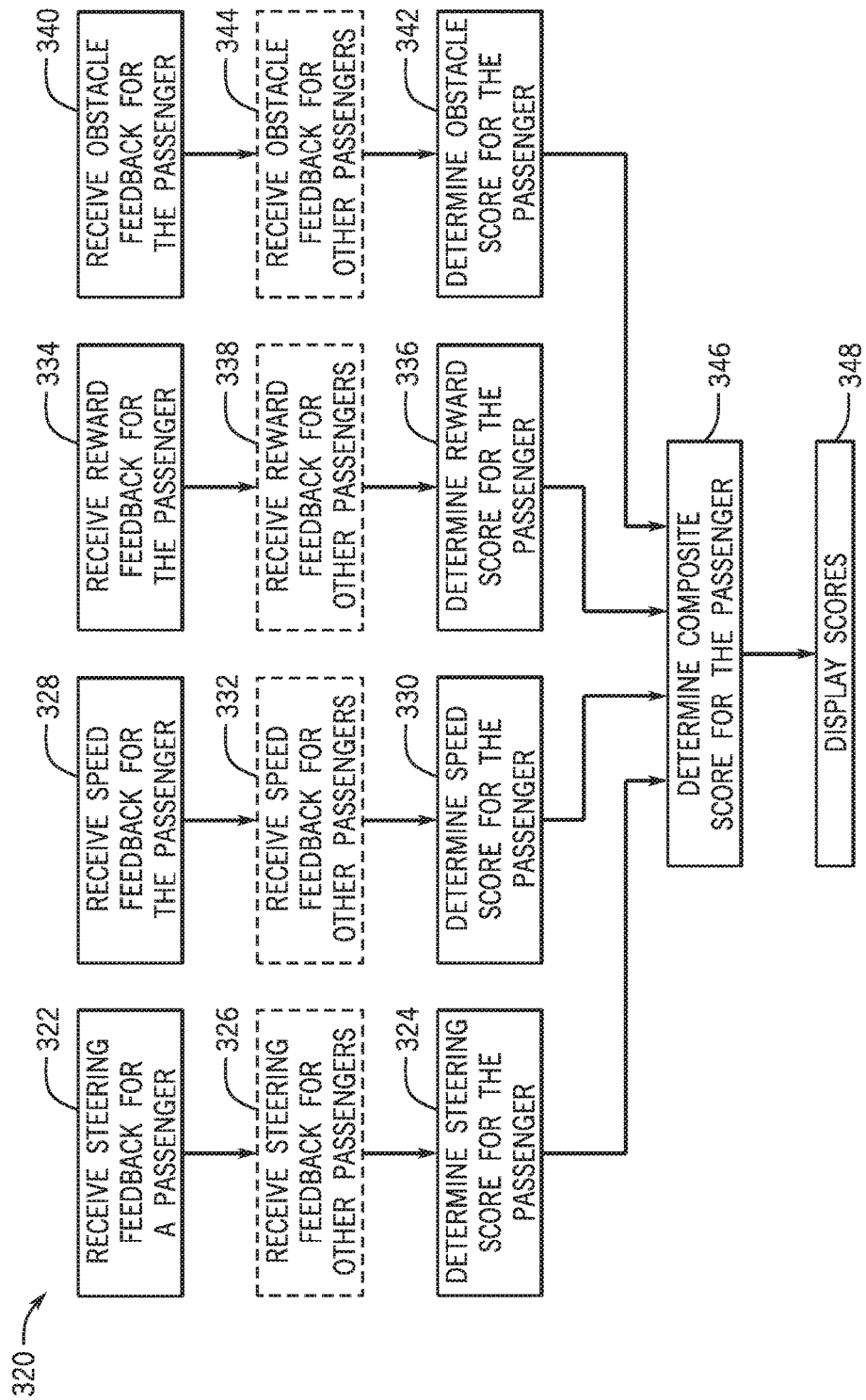
FIG. 7 is a flow diagram of a method for determining passenger performance in accordance with present techniques.

Additionally, the vehicle controller 70 may use the feedback from the user input devices 34 to determine one or more performance metrics associated with each multi-passenger ride vehicle 12 in the interactive ride system 10. For example, FIG. 7 illustrates an embodiment of a method 320 for determining one or more performance metrics for each passenger 16 in a multi-passenger ride vehicle 12. The method 320 may be performed entirely or in part by the vehicle controller 70 as provided herein using control logic or programming. For example, the vehicle controller 70 may receive steering feedback for a passenger 16 of a multi-passenger ride vehicle 12 (block 322). The vehicle controller 70 may receive the steering feedback from one or more steering user input devices 34 that were actuated by the passenger 16 and that generate feedback that may be used by the vehicle controller 70 to control the steering of the multi-passenger ride vehicle 12. For example, the one or more steering user input devices 34 may include the steering wheel 36 and/or the joystick 44. In some embodiments, the vehicle controller 70 may receive the steering feedback from the one or more steering user input devices 34 when the steering user input devices 34 are activated (e.g., feedback is used by the vehicle controller 70 to control the steering of the multi-passenger ride vehicle 12). In certain embodiments, the vehicle controller 70 may receive the steering feedback from the one or more steering user input devices 34 even when the steering user input devices 34 are deactivated (e.g., feedback is not used by the vehicle controller 70 to control the steering of the multi-passenger ride vehicle 12). Indeed, as noted above, the vehicle controller 70 may receive feedback from deactivated user input devices 34. That is, a passenger 16 may actuate a deactivated user input device 34, and the vehicle controller 70 may receive feedback from the deactivated user input device 34 based on the actuation and may not use the feedback to control operation of the multi-passenger ride vehicle 12.

The vehicle controller 70 may determine a steering score for the passenger based on the steering feedback (block 324). For example, the vehicle controller 70 may determine the steering score by comparing a vehicle path resulting from the passenger's steering to an "ideal" path, which may be stored in the memory 76, determined by the vehicle controller 70, or received from the system controller 72. The vehicle path may include an actual path taken by the multi-passenger ride vehicle 12 as a result of the steering of the passenger 16, a hypothetical path based on steering feedback from deactivated steering user input devices 34 controlled by the passenger 16, or a combination thereof. The "ideal" path may be a route that enables the multi-passenger ride vehicle 12 to complete the ride course 30 in the fastest time, to obtain the greatest number of rewards, to avoid the most obstacles, or a combination thereof. In some embodiments, the vehicle controller 70 may evaluate and/or quantify the "jerkiness" or "smoothness" of turns to determine the steering score. Further, in some embodiments, the vehicle controller 70 may use collision information in the determination of the steering score. For example, the vehicle controller 70 may assign a lower steering score or decrease the steering score if feedback from the steering user input devices 34 was overridden by the vehicle controller 70 and/or the system controller 72 to avoid a collision or if feedback from deactivated steering user input devices 34 would have resulted in a collision.

In some embodiments, the vehicle controller 70 may also receive steering feedback from one or more steering user input devices 34 controlled by other passengers 16 in the multi-passenger ride vehicle 12 (block 326) and may compare the steering feedback from the passenger 16 to the steering feedback from the other passengers 16 to determine the steering score (block 324). For example, the vehicle controller 70 may compare steering feedback from the passenger 16 from one or more locations of the ride course 30 with steering feedback from the other passengers 16 from the same one or more locations.

In certain embodiments, the vehicle controller 70 may receive speed feedback for the passenger 16 of the multi-passenger ride vehicle 12 (block 328). For example, the vehicle controller 70 may receive the speed feedback from one or more speed user input devices 34 that were actuated by the passenger 16 and that generate feedback that may be used by the vehicle controller 70 to control the speed, acceleration, and/or deceleration of the multi-passenger ride vehicle 12. That is, the speed feedback may also include acceleration and deceleration feedback. For example, the one or more speed user input devices 34 may include the gas pedal 40 and/or the brake pedal 42. The vehicle controller 70 may receive the speed feedback from activated and/or deactivated speed user input devices 34.

The vehicle controller 70 may determine a speed score for the passenger 16 based on the speed feedback (block 330). For example, the vehicle controller 70 may determine the speed score by comparing an average speed resulting from the speed feedback to an "ideal" average speed, which may be stored in the memory 76, determined by the vehicle controller 70, or received from the system controller 72. The "ideal" average speed may enable the multi-passenger ride vehicle 12 to complete the ride course 30 in the fastest time. In some embodiments, the vehicle controller 70 may compare the speed feedback from one or more locations of the ride course 30 with "ideal" speeds for the same one or more locations to determine the speed score. In certain embodiments, the vehicle controller 70 may use one or more metrics, such as average speed, maximum speed, minimum speed, standard deviation of speed, etc., in the determination of the speed score.

In some embodiments, the vehicle controller 70 may also receive speed feedback from one or more speed user input devices 34 controlled by other passengers 16 in the multi-passenger ride vehicle 12 (block 332) and may compare the speed feedback from the passenger 16 to the speed feedback from the other passengers 16 to determine the speed score (block 330). For example, the vehicle controller 70 may compare an average speed resulting from the speed feedback of the passenger 16 to average speeds resulting from the speed feedback of the other passengers. In some embodiments, the vehicle controller 70 may compare speed feedback from the passenger 16 from one or more locations of the ride course 30 with speed feedback from the other passengers 16 from the same one or more locations.

Additionally, the vehicle controller 70 may receive reward feedback for the passenger 16 of the multi-passenger ride vehicle 12 (block 334). The vehicle controller 70 may receive the reward feedback from one or more reward user input devices 34 that were actuated by the passenger 16 and that generate feedback that may be used by the vehicle controller 70 to obtain rewards for the multi-passenger ride vehicle 12. For example, the one or more reward user input devices 34 may include the steering wheel 36, the buttons 42 (e.g., the reward button 156), the joystick 44, or a combination thereof. The vehicle controller 70 may receive the reward feedback from activated and/or deactivated reward user input devices 34. Additionally, the vehicle controller 70 may receive reward feedback (e.g., data or information relating to the distance between the multi-passenger ride vehicle 12 and a reward) from the cameras 140, the sensors 98, the sensor 100, or a combination thereof.

Further, the vehicle controller 70 may determine a reward score for the passenger 16 based on the reward feedback (block 336). For example, as described in detail above, the vehicle controller 70 may award points (e.g., reward points) to the passenger 16 when the passenger 16 controls a reward user input device 34 to obtain a reward. In some embodiments, the vehicle controller 70 may determine the reward score based on the number of award points for the passenger 16. In certain embodiments, the vehicle controller 70 may compare the number of reward points to a total number of possible reward points for the ride course 30 to determine the reward score. Additionally, the vehicle controller 70 may determine the reward score based on a percentage of rewards obtained by the passenger 16 from a total number of possible rewards for the ride course 30.

The vehicle controller 70 may also receive reward feedback from one or more reward user input devices 34 controlled by other passengers 16 in the multi-passenger ride vehicle 12 (block 338) and may compare the reward feedback from the passenger 16 to the reward feedback from the other passengers 16 to determine the reward score (block 336). For example, the vehicle controller 70 may compare the number of award points for the passenger 16 to the number of award points of the other passengers 16. In some embodiments, the vehicle controller 70 may compare the percentage of obtained rewards for the passenger 16 to the percentage of obtained rewards for the other passengers 16.

Further, the vehicle controller 70 may receive obstacle feedback for the passenger 16 of the multi-passenger ride vehicle 12 (block 340). The vehicle controller 70 may receive the obstacle feedback from one or more obstacle user input devices 34 that were actuated by the passenger 16 and that generate feedback that may be used by the vehicle controller 70 to avoid and/or cause display of obstacles. For example, the one or more obstacle user input devices 34 may include the steering wheel 36, the buttons 42 (e.g., the obstacle button 158), the joystick 44, or a combination thereof. The vehicle controller 70 may receive the obstacle feedback from activated and/or deactivated obstacle user input devices 34. Additionally, the vehicle controller 70 may receive the obstacle feedback (e.g., data or information relating to a distance between the multi-passenger ride vehicle 12 and an obstacle) from the cameras 140, the sensors 98, the sensors 100, or a combination thereof.

Further, the vehicle controller 70 may determine an obstacle score for the passenger 16 based on the obstacle feedback (block 342). For example, as described in detail above, the vehicle controller 70 may award points (e.g., obstacle points) to the passenger 16 when the passenger 16 controls an obstacle user input device 34 to avoid an obstacle and when the passenger 16 controls an obstacle user input device 34 to display a virtual obstacle 136 that another passenger 16 fails to avoid. In some embodiments, the vehicle controller 70 may determine the obstacle score based on the number of obstacle points for the passenger 16. In certain embodiments, the vehicle controller 70 may compare the number of obstacle points to a total number of possible obstacle points for the ride course 30 to determine the obstacle score. Additionally, the vehicle controller 70 may determine the obstacle score based on a percentage of obstacles avoided by the passenger 16 from a total number of possible obstacles for the ride course 30.

The vehicle controller 70 may also receive obstacle feedback from one or more obstacle user input devices 34 controlled by other passengers 16 in the multi-passenger ride vehicle 12 (block 344) and may compare the obstacle feedback from the passenger 16 to the obstacle feedback from the other passengers 16 to determine the obstacle score (block 342). For example, the vehicle controller 70 may compare the number of obstacle points for the passenger 16 to the number of obstacle points of the other passengers 16. In some embodiments, the vehicle controller 70 may compare the percentage of avoided obstacles for the passenger 16 to the percentage of avoided obstacles for the other passengers 16.

Additionally, the vehicle controller 70 may determine a composite score for the passenger 16 based on the steering score, the speed score, the reward score, and the obstacle score (block 346). For example, the vehicle controller 70 may add the steering score, the speed score, the reward score, and the obstacle score together to determine the composite score. Further, the vehicle controller 70 may also cause display of the steering score, the speed score, the reward score, the obstacle store, the composite score, or a combination thereof for the passenger 16 (block 348). For example, the vehicle controller 70 may cause the display module 110 of the multi-passenger ride vehicle 12 to display the steering score, the speed score, the reward score, the obstacle store, and/or the composite score on a display of the multi-passenger ride vehicle 12, such as the heads-up display 166, an LCD screen, and/or a touch-screen display. In some embodiments, the vehicle controller 70 may cause the display module 104 of the ride environment 28 to display the scores. In certain embodiments, the vehicle controller 70 may cause display of all of the scores for the passenger 16. In one embodiment, the vehicle controller 70 may only cause display of the composite score. In some embodiments, the vehicle controller 70 may periodically or continuously determine the steering score, the speed score, the reward score, the obstacle store, and/or the composite score throughout the duration of the ride. In such embodiments, the vehicle controller 70 may display the steering score, the speed score, the reward score, the obstacle store, and/or the composite score during the ride and may periodically or continuously update the scores on the display throughout the ride. In one embodiment, the vehicle controller 70 may determine and cause display of the steering score, the speed score, the reward score, the obstacle store, and/or the composite score after the ride is completed.

Figure 8:
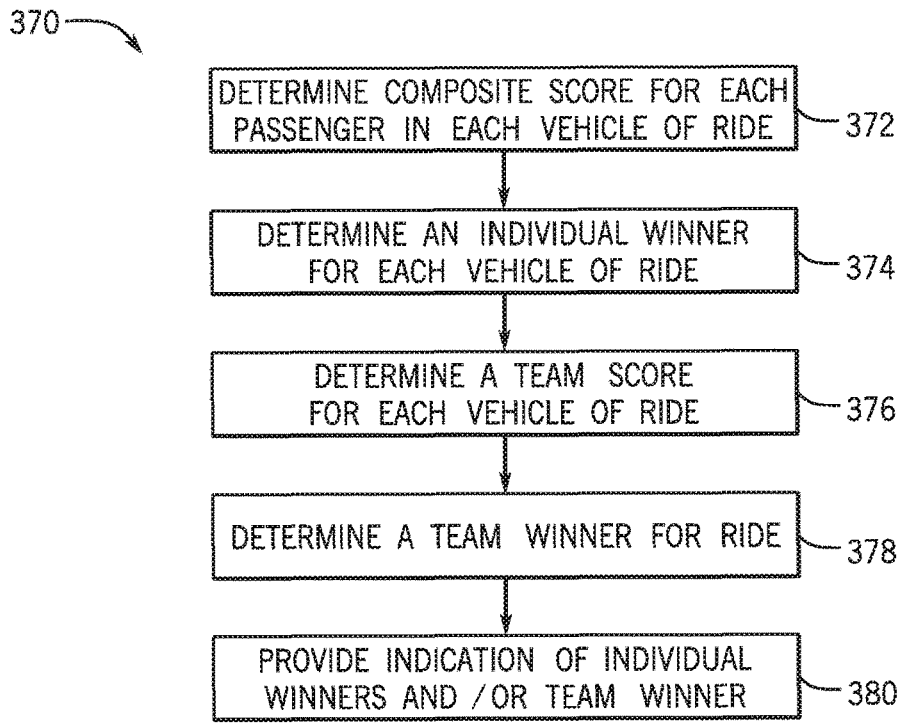
FIG. 8 is a flow diagram of a method for determining a winner of an interactive ride in accordance with the present techniques.

FIG. 8 illustrates an embodiment of a method 370 for determining the winner of a race or ride of the interactive ride system 10. The method 370 may be performed entirely or in part by the vehicle controller 70 as provided herein using control logic or programming. For example, the vehicle controller 70 may determine the composite score for each passenger 16 in each multi-passenger ride vehicle 12 of the race or ride (block 372). The vehicle controller 70 may determine the composite score using any of the techniques described above in any combination. The vehicle controller 70 may determine an individual winner in each multi-passenger ride vehicle 12 (block 374). For example, the passenger 16 with the highest composite score in each multi-passenger ride vehicle 12 may be the winner. Further, in embodiments in which the race or ride includes more than one multi-passenger ride vehicle 12, the vehicle controller 12 may determine a team score for each multi-passenger ride vehicle 12 based on the composite scores of the passengers 12 within each multi-passenger ride vehicle 12 (block 376) and the vehicle controller 12 may determine a team winner based on the team scores for each multi-passenger ride vehicle (block 378). For example, the multi-passenger ride vehicle 12 with the highest team score may be the winner. In some embodiments, the vehicle controller 70 may also determine an individual winner for the ride, which may be the passenger 16 with the highest composite score in the ride. Additionally, the vehicle controller 70 may be configured to provide an indication of the individual winner and/or the team winner (block 380). For example, the vehicle controller 70 may cause the display module 110 and/or the display module 104 to display an indication of the individual winner and/or the team winner. The vehicle controller 70 may determine the individual winner and the team winner after the ride is completed. However, in some embodiments, the vehicle controller 70 may also use the composite scores and the team scores periodically or continuously during the ride to determine which passengers 16 and which multi-passenger ride vehicle 12 are currently in the lead, and the vehicle controller 70 may provide indications of the leading passengers 16 and the leading multi-passenger ride vehicle 12 to provide added interest during the ride.

Figure 9:
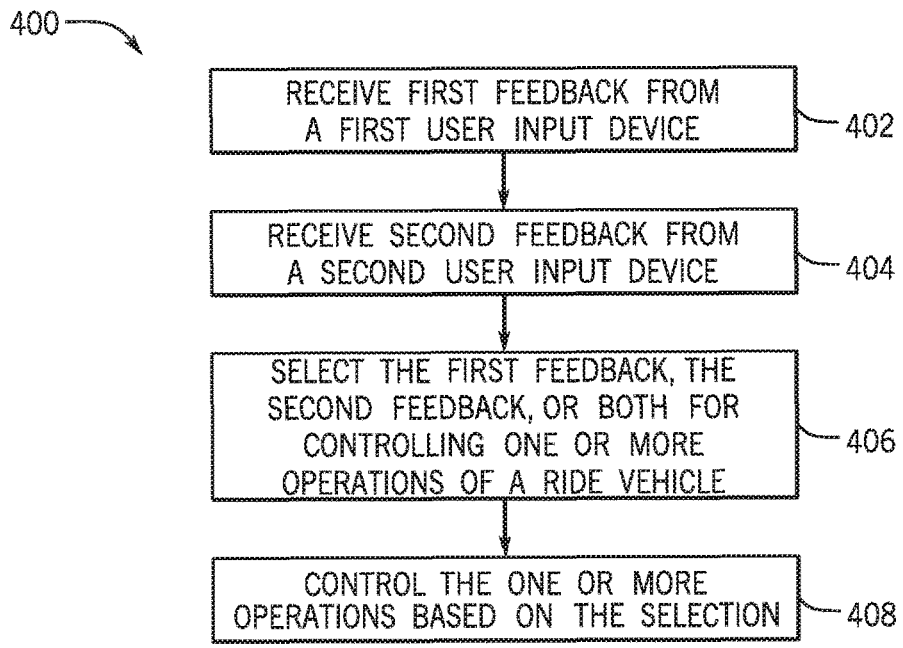
FIG. 9 is a flow diagram of a method for controlling one or more operations of a multi-passenger ride vehicle based on feedback from one or more user input devices in accordance with the present techniques.

FIG. 9 illustrates a method 400 for controlling the movement of a multi-passenger ride vehicle 12 based on feedback from at least one user input device 34. The method 400 may be performed entirely or in part by the vehicle controller 70 as provided herein using control logic or programming. For example, the vehicle controller 70 may receive first feedback from a first user input device 34 (block 402), which may be controlled by a first passenger 16. Additionally, the vehicle controller 70 may receive second feedback from a second user input device 34 (block 404), which may be controlled by a second passenger 16. The first feedback and the second feedback may be the same type of feedback or may be different types of feedback. Further, the first user input device 34 may be the same type as the second user input device 34 or may be a different type than the second user input device 34. For example, in one embodiment, the first and second user input devices 34 may both be steering wheels 36. In another embodiment, the first user input device 34 may be a steering wheel 36 and the second user input device may be a gas pedal 38. It should be appreciated that any combination of the user input devices 34 described above may be used. Further, it should be appreciated that in some embodiments, the vehicle controller 70 may receive feedback from more than two user input devices 34, which may be controlled by more than two passengers 16. Additionally, in some embodiments, the vehicle controller 70 may receive feedback from two or more user input devices 34 that are controlled by the same passenger 16. In some embodiments, each passenger 16 may control two or more user input devices 34, and each passenger 16 may control the same types of user input devices 34 as the other passengers 16 in the multi-passenger ride vehicle 12. For example, in one embodiment, each passenger 16 of the multi-passenger ride vehicle 12 may control a steering wheel 36, a gas pedal 38, a brake pedal 40, and one or more buttons 42, and the vehicle controller 70 may receive feedback from each user input device 34 controlled by each passenger 16 in the multi-passenger ride vehicle 12.

The vehicle controller 70 may select the first feedback, the second feedback, or both for controlling one or more operations of the multi-passenger ride vehicle 12 (block 406). As noted above, the one or more operations of the multi-passenger ride vehicle 12 may include movement of the multi-passenger ride vehicle 12, speed of the multi-passenger ride vehicle 12, direction of the multi-passenger ride vehicle 12, orientation of the multi-passenger ride vehicle 12, interaction between the multi-passenger ride vehicle 12 and rewards in the ride environment 28, interaction between the multi-passenger ride vehicle 12 and obstacles in the ride environment 28, and/or interaction between the multi-passenger ride vehicle 12 and other features and/or other multi-passenger ride vehicles 12 in the ride environment 28. It should be noted that in embodiments in which the vehicle controller 70 receives feedback from more than two user input devices 34, the vehicle controller 70 may select feedback from one, two, or any number of the user input devices 34. In some embodiments, the vehicle controller 70 may select the first feedback, the second feedback, or both based on a predetermined schedule, which may be stored in the memory 76. In certain embodiments, the vehicle controller 70 may select the first feedback, the second feedback, or both based on the type of feedback of the first and second feedback, the type of the first and second user input devices 34, and/or the passengers 16 or passenger performance of the passengers 16 controlling the first and second user input devices 34. In some embodiments, the vehicle controller 70 may select both the first feedback and the second feedback when the first and second feedback are different types. For example, the vehicle controller 70 may select both the first and second feedback to control movement of the multi-passenger ride vehicle 12 and may use the first feedback (e.g., steering feedback) to control the direction of the multi-passenger ride vehicle 12 and the second feedback (e.g., speed feedback) to control the speed of the multi-passenger ride vehicle 12. In other embodiments, the vehicle controller 70 may select both the first feedback and the second feedback when the first and second feedback are the same type. For example, the vehicle controller 70 my combine the first and second feedback to determine a combined feedback. The vehicle controller 70 may combine the first feedback and the second feedback by adding the first and second feedback, subtracting one from the other, averaging the first and second feedback, determining a weighted average of the first and second feedback, or using any other suitable processing techniques. In some embodiments, the vehicle controller 70 determine a score for the first feedback and the second feedback, as described above in FIG. 7, weight the first feedback and the second feedback based on their respective scores, and determine a weighted average for the first and second feedback based on the weighted first and second feedback. For example, the feedback with the higher score may be assigned a higher weight.

In certain embodiments, the vehicle controller 70 may select the first feedback or the second feedback based on the scores. For example, the vehicle controller 70 may select the first feedback when the score for the first feedback is higher than the score for the second feedback and vice versa. In other embodiments, the vehicle controller 70 may determine a composite score or individual score for each passenger 16 in the multi-passenger ride vehicle 12, as described in detail above in FIG. 7, and may select the first feedback or the second feedback based on the individual scores for each passenger 16. For example, the vehicle controller 70 may select the first feedback when the individual score for the passenger 16 controlling the first user input device 34 is greater than the individual score for the passenger 16 controlling the second user input device 34 and vice versa.

Additionally, in some embodiments, selecting the first feedback, the second feedback, or both for controlling one or more operations of the multi-passenger ride vehicle 12 (block 406) may include selecting first feedback, the second feedback, or both for controlling each operation of the one or more operations of the multi-passenger ride vehicle 12. That is, some types of feedback may not be associated with certain operations and thus, it may be desirable to use different combinations of feedback for different operations. By way of example, the first user input device 34 may be a steering wheel 36 that generates steering feedback, and the second user input device 34 may be the reward button 156 that generates reward feedback. The vehicle controller 70 may select the steering feedback to control the movement (e.g., steering) of the multi-passenger ride vehicle 12 and may select both the steering feedback and the reward feedback to control interaction with rewards.

Accordingly, the vehicle controller 70 may control the one or more operations of the multi-passenger ride vehicle 12 based on the one or more selections (block 408). In certain embodiments, the vehicle controller 70 may be configured to control the movement of the multi-passenger ride vehicle 12 based on a vehicle path (e.g., the variable path 32) determined by the vehicle controller 70. In particular, the vehicle controller 70 may determine a vehicle path for the multi-passenger ride vehicle 12 based on the selection (e.g., the selection for controlling the movement of the multi-passenger ride vehicle 12). That is, the vehicle controller 70 may select the first feedback, the second feedback, or both, as described in detail above, and may determine the vehicle path based on the selection. The vehicle controller 70 may determine a vehicle path 32 that includes variable speed, variable direction (e.g., forward, backward, sideways, diagonally, etc.), variable orientation for the multi-passenger ride vehicle 12. For example, the vehicle controller 70 may cause the multi-passenger ride vehicle 12 to spin, pitch, roll, and/or yaw to change the orientation of the multi-passenger ride vehicle 12. Thus, the vehicle controller 70 may use feedback associated with the speed of the multi-passenger ride vehicle 12, feedback associated with the direction of the multi-passenger ride vehicle 12, and/or feedback associated with the orientation of the multi-passenger ride vehicle 12 to determine the vehicle path. In some embodiments, the vehicle controller 70 may not receive or may not select steering feedback, direction feedback, and orientation feedback to determine the vehicle path and control movement of the multi-passenger ride vehicle 12. In such embodiments, the vehicle controller 70 may be configured to select one or more default settings for the speed, direction, and/or orientation, as appropriate, to use in the determination of the vehicle path. The default settings may be stored in the memory 76 and in some embodiments, may be specific for each ride course 30 and/or sections of each ride course 30.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another. For example, while the present embodiments include various techniques and methods that are described as performed by the vehicle controller 70, it should be noted that any of the techniques and methods described above may additionally or alternatively be performed by the system controller 72.

The invention claimed is:

1. A control system configured to control a multi-passenger ride vehicle, the control system comprising:
  a controller configured to:
    receive a first passenger feedback from a first passenger input device;
    receive a second passenger feedback from a second passenger input device;
    select the first passenger feedback, the second passenger feedback, or a combination thereof as a selection;
    determine a vehicle path using the first passenger feedback, the second passenger feedback, or the combination thereof based on the selection; and control movement of the multi-passenger ride vehicle based on the vehicle path.

2. The control system of claim 1, wherein the vehicle path comprises a speed of the multi-passenger ride vehicle, a direction of the multi-passenger ride vehicle, an orientation of the multi-passenger ride vehicle, an acceleration of the multi-passenger ride vehicle, or any combination thereof.

3. The control system of claim 1, comprising the first passenger input device, wherein the first passenger input device comprises a steering wheel, a gas pedal, a brake pedal, a button, a joystick, or any combination thereof.

4. The control system of claim 1, wherein the controller is configured to control a position of an axle of the multi-passenger ride vehicle, a motor of the multi-passenger ride vehicle, a brake of the multi-passenger ride vehicle, or a combination thereof to control the movement of the multi-passenger ride vehicle.

5. The control system of claim 1, wherein the controller is configured to receive sensor feedback relating to a ride environment or a disposition of the multi-passenger ride vehicle, and wherein the controller is configured to determine the vehicle path based on the sensor feedback.

6. The control system of claim 5, wherein the controller is configured to compare the sensor feedback with the first passenger feedback, and wherein the controller is configured to override the first passenger feedback in view of the comparison of the sensor feedback with the first passenger feedback.

7. The control system of claim 5, wherein the controller is configured to compare the sensor feedback with the first passenger feedback and the second passenger feedback, and wherein the controller is configured to override the first passenger feedback and the second passenger feedback in view of the comparison of the sensor feedback with the first passenger feedback and the second passenger feedback.

8. The control system of claim 5, wherein the controller is configured to:
    determine an adjustment to the vehicle path based on the sensor feedback; and
    revise the vehicle path based on the adjustment to the vehicle path prior to controlling the movement of the multi-passenger ride vehicle based on the vehicle path.

9. The control system of claim 5, wherein the sensor feedback comprises data relating to boundaries of a ride course the multi-passenger ride vehicle operates in, physical objects within the ride environment, other multi-passenger ride vehicles in the ride course, or any combination thereof.

10. The control system of claim 1, wherein the controller is configured to compare the first passenger feedback to corresponding data of a predetermined ideal vehicle path.

11. A method of controlling a multi-passenger ride vehicle, comprising:
    receiving, via a controller, first passenger feedback from a first passenger input device of a multi-passenger ride vehicle;
    receiving, via the controller, second passenger feedback from a second passenger input device of the multi-passenger ride vehicle;
    determining, via the controller, a vehicle path based on the first passenger feedback, the second passenger feedback, or a combination thereof; and
    controlling, via the controller, movement of the multi-passenger ride vehicle based on the vehicle path.

12. The method of claim 11, comprising:
    receiving, via the controller, sensor feedback related to a ride environment or a disposition of the multi-passenger ride vehicle; and
    determining, via the controller, the vehicle path based on the received sensor feedback.

13. The method of claim 12, wherein determining the vehicle path based on the received sensor feedback comprises selecting, via the controller, between the received sensor feedback and the first passenger feedback, the second passenger feedback, or the combination thereof.

14. The method of claim 12, wherein determining the vehicle path based on the received sensor feedback comprises adjusting, via the controller, the first passenger feedback, the second passenger feedback, or the combination thereof based on the sensor feedback.

15. The method of claim 12, wherein determining the vehicle path based on the received sensor feedback comprises:
    determining, via the controller, a first unadjusted vehicle path based on the received first passenger feedback, the received second passenger feedback, or the combination thereof; and
    determining, via the controller, a second adjusted vehicle path based on the received sensor feedback, wherein controlling the movement of the multi-passenger ride vehicle based on the vehicle path comprises controlling, via the controller, the movement of the multi-passenger ride vehicle based on the determined second adjusted vehicle path.

16. A system, comprising:
    a multi-passenger ride vehicle configured to accommodate a plurality of passengers;
    a first passenger input device positioned proximate a first passenger seat of the multi-passenger ride vehicle, wherein the first passenger input device is configured to receive a first input from a first passenger of the plurality of passengers, and configured to generate a first feedback in response to the first input;
    a second passenger input device positioned proximate a second passenger seat of the multi-passenger ride vehicle, wherein the second passenger input device is configured to receive a second input from a second passenger of the plurality of passengers, and configured to generate a second feedback in response to the second input from the second passenger;
    a sensor configured to receive sensor feedback relating to a ride environment, a disposition of the multi-passenger ride vehicle, or a combination thereof; and
    a controller configured to receive the first feedback, the second feedback, and the sensor feedback, and to control one or more operations of the multi-passenger ride vehicle based on the first received feedback, the second received feedback, and the received sensor feedback.

17. The system of claim 16, wherein the controller is configured to control a first operation of the one or more operations based on the received first feedback, and to control a second operation of the one or more operations based on the received second feedback.

18. The system of claim 16, wherein the controller is configured to compare the received first feedback, the received second feedback, or a combination thereof with a corresponding control threshold value.

19. The system of claim 18, wherein the controller is configured to control the one or more operations by overriding the first feedback, the second feedback, or a combination thereof, based on the comparison of the received first feedback, the received second feedback, or the combination thereof with the corresponding control threshold value.

20. The system of claim 18, wherein the controller is configured to control the one or more operations by determining a baseline operation in view of the received first feedback and the received second feedback, by determining an adjusted operation of the baseline operation in view of the received sensor feedback, and by executing the adjusted operation of the baseline operation.

\* \* \* \* \*